(12) United States Patent
Gallant et al.

(10) Patent No.: US 7,478,460 B2
(45) Date of Patent: Jan. 20, 2009

(54) SHEAR FASTENERS

(75) Inventors: Christopher M. Gallant, Nottingham, NH (US); William P. Clune, Northwood, NH (US)

(73) Assignee: Velcro Industries B.V., Curacao (AN)

( * ) Notice: Subject to any disclaimer, the term of this patent is extended or adjusted under 35 U.S.C. 154(b) by 366 days.

(21) Appl. No.: 10/785,133

(22) Filed: Feb. 24, 2004

(65) Prior Publication Data
US 2005/0183248 A1  Aug. 25, 2005

(51) Int. Cl.
A44B 18/00 (2006.01)

(52) U.S. Cl. .......................................... 24/452; 24/306

(58) Field of Classification Search .................. 24/306, 24/442–452, 16 PB, 584.1–590.1; 292/307 R, 292/325, 307 A, 307 B; 428/99, 100; 604/391; 297/218.2–218.4
See application file for complete search history.

(56) References Cited

U.S. PATENT DOCUMENTS

| | | | | |
|---|---|---|---|---|
| 184,397 A * | 11/1876 | Macumber | ................ | 24/20 EE |
| 2,461,201 A | 2/1949 | Ellis | ................ | 2/311 |
| 3,462,802 A * | 8/1969 | Merser | ................ | 24/16 PB |
| 3,462,805 A * | 8/1969 | Quisling | ................ | 24/586.11 |
| 3,462,806 A * | 8/1969 | Quisling | ................ | 24/401 |
| 3,748,697 A * | 7/1973 | Marchese et al. | ................ | 24/19 |
| 3,964,133 A * | 6/1976 | Wasserlein, Jr. | ................ | 24/20 R |
| 4,183,121 A | 1/1980 | Cousins | ................ | 24/588.1 |
| 4,198,734 A | 4/1980 | Brumlik | ................ | 24/449 |
| 4,271,566 A | 6/1981 | Perina | ................ | 24/442 |
| 4,537,432 A * | 8/1985 | Meeks | ................ | 24/16 PB |
| 4,557,024 A | 12/1985 | Roberts et al. | ................ | 24/20 TT |
| 4,680,838 A | 7/1987 | Astl | ................ | 24/442 |
| D295,768 S * | 5/1988 | Kushner | ................ | D21/494 |
| 4,775,310 A | 10/1988 | Fischer | ................ | 425/308 |
| 4,794,674 A * | 1/1989 | Mintel et al. | ................ | 24/712.1 |
| 4,863,127 A | 9/1989 | Handler | ................ | 248/205.2 |
| 4,879,854 A | 11/1989 | Handler | ................ | 52/238.1 |
| 4,887,338 A | 12/1989 | Handler | ................ | 24/306 |
| 4,887,339 A * | 12/1989 | Bellanger | ................ | 24/20 EE |
| 4,941,238 A * | 7/1990 | Clark | ................ | 24/437 |
| 5,005,242 A | 4/1991 | Kennedy et al. | ................ | 24/444 |
| 5,101,539 A | 4/1992 | Kennedy et al. | ................ | 24/442 |
| 5,179,767 A * | 1/1993 | Allan | ................ | 24/442 |

(Continued)

FOREIGN PATENT DOCUMENTS

EP  0 399 574 A  11/1990

(Continued)

OTHER PUBLICATIONS

Correspondence from Foreign Associate in counterpart Application No. EP 05723824.8.

Primary Examiner—Robert J Sandy
Assistant Examiner—Ruth C Rodriguez
(74) Attorney, Agent, or Firm—Fish & Richardson P.C.

(57) ABSTRACT

A fastener element with a sheet-form base and an array of wedge-shaped engageable elements molded integrally with a surface of the sheet-form base. The wedge-shaped elements each have a steep side and a gradually rising side, and are arranged with their steep sides all directed in a common sense, such that the array can engage a similar array of oppositely-directed wedge-shaped elements to resist shear motion. The distal edges of the wedges are curved in top view.

46 Claims, 24 Drawing Sheets

U.S. PATENT DOCUMENTS

| | | | | |
|---|---|---|---|---|
| 5,208,952 | A | | 5/1993 | Mintel et al. ............. 24/588.11 |
| 5,212,853 | A | * | 5/1993 | Kaneko ....................... 24/452 |
| 5,216,784 | A | | 6/1993 | Dyer ....................... 24/20 TT |
| 5,345,659 | A | | 9/1994 | Allan .......................... 24/442 |
| 5,368,549 | A | | 11/1994 | McVicker ................... 24/452 |
| 5,499,859 | A | | 3/1996 | Angell ..................... 297/218.3 |
| 5,605,373 | A | | 2/1997 | Wildern, IV et al. ..... 297/218.4 |
| 5,640,744 | A | * | 6/1997 | Allan .......................... 24/442 |
| 5,653,004 | A | | 8/1997 | Russo ....................... 24/586.1 |
| 5,656,014 | A | * | 8/1997 | Rooney et al. ............. 600/240 |
| 5,657,516 | A | | 8/1997 | Berg et al. ................... 24/452 |
| 5,704,480 | A | | 1/1998 | Scholz et al. .............. 206/438 |
| 5,753,332 | A | * | 5/1998 | Hsu ............................ 428/52 |
| 5,766,723 | A | | 6/1998 | Oborny et al. ............. 428/100 |
| 5,826,312 | A | | 10/1998 | Schroder et al. .......... 24/601.2 |
| 5,827,547 | A | | 10/1998 | Burchi et al. ............... 425/116 |
| 5,882,073 | A | | 3/1999 | Burchi et al. ............ 297/218.2 |
| 5,945,193 | A | | 8/1999 | Pollard et al. .............. 428/100 |
| 5,953,797 | A | | 9/1999 | Provost et al. ................ 24/452 |
| 5,964,017 | A | | 10/1999 | Roberts ....................... 29/91.1 |
| 5,983,467 | A | * | 11/1999 | Duffy .......................... 24/442 |
| 6,085,394 | A | * | 7/2000 | Hartman ................... 24/20 EE |
| 6,129,970 | A | | 10/2000 | Kenney et al. .............. 428/100 |
| 6,311,362 | B1 | * | 11/2001 | Arbogast ................. 15/236.08 |
| 6,432,339 | B1 | | 8/2002 | Jens et al. .................... 264/167 |
| 6,487,759 | B1 | * | 12/2002 | Akeno et al. ............... 24/589.1 |
| 6,625,851 | B1 | * | 9/2003 | Martin et al. ................. 24/462 |
| 6,668,429 | B2 | | 12/2003 | Fujisawa et al. .............. 24/303 |
| 6,911,171 | B2 | * | 6/2005 | Lauer .......................... 264/248 |
| 7,117,536 | B2 | * | 10/2006 | Burnett et al. .................... 2/16 |
| 7,212,869 | B2 | * | 5/2007 | Wahlstrom et al. .......... 607/126 |
| 2002/0023322 | A1 | * | 2/2002 | Murasaki ..................... 24/452 |
| 2002/0078536 | A1 | | 6/2002 | Martin et al. ................. 24/450 |
| 2003/0074771 | A1 | | 4/2003 | Duffy .......................... 24/442 |

FOREIGN PATENT DOCUMENTS

| | | |
|---|---|---|
| EP | 0 399 574 A2 | 11/1990 |
| EP | 0 741 979 A2 | 11/1996 |
| WO | WO 98/29003 | 7/1998 |
| WO | WO 00/00407 | 1/2000 |
| WO | WO 00/07792 | 2/2000 |
| WO | WO 00/18556 | 4/2000 |
| WO | WO 01/12022 | 2/2001 |
| WO | WO 01/37710 | 5/2001 |

* cited by examiner

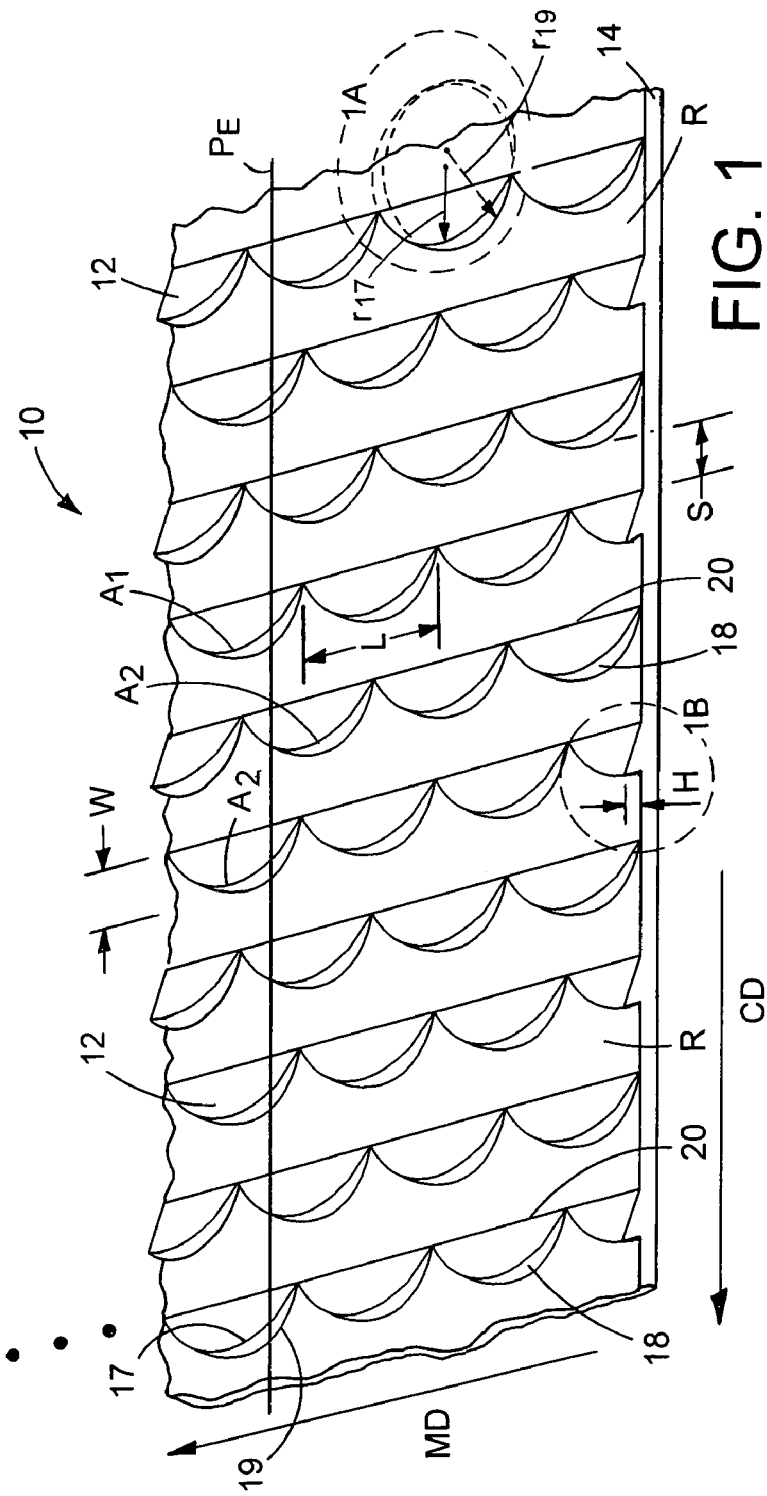
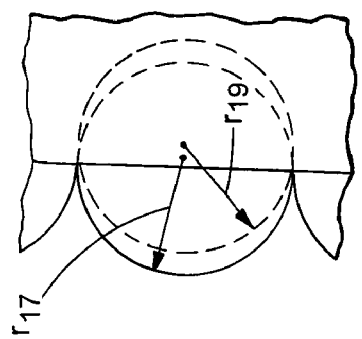
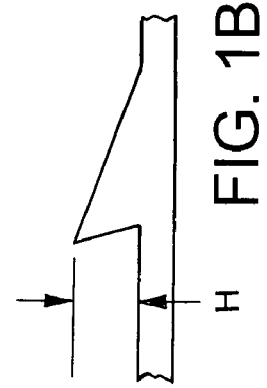
FIG. 1
FIG. 1A
FIG. 1B

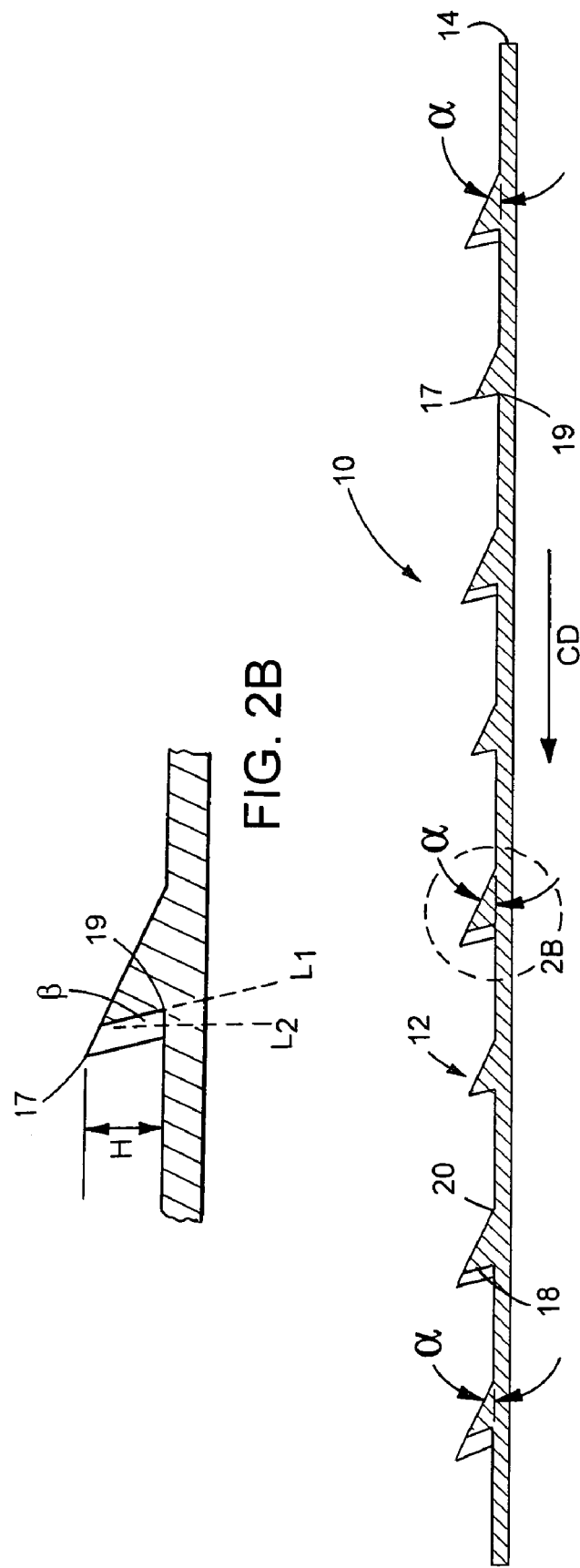

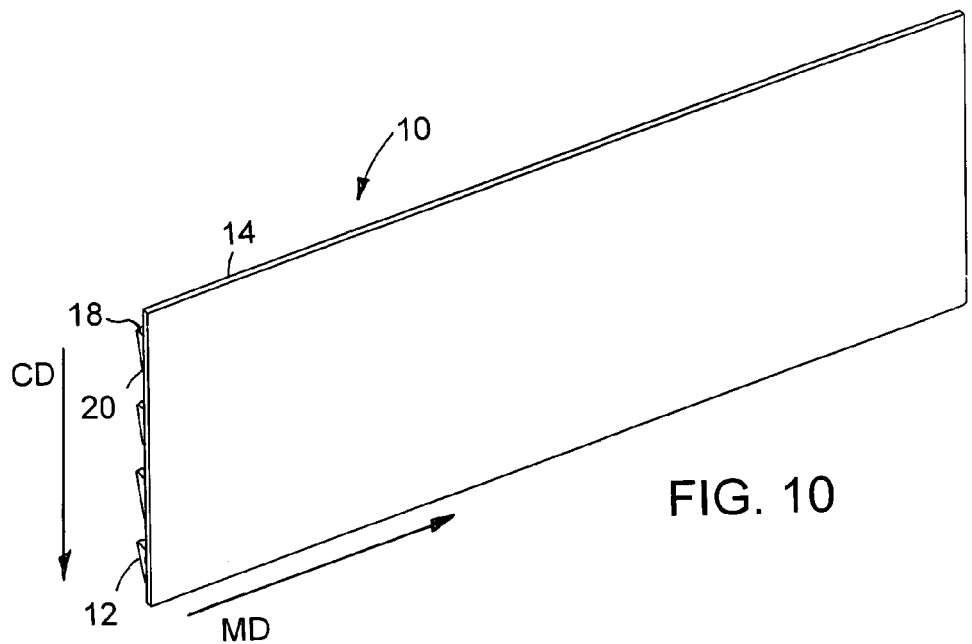
FIG. 10
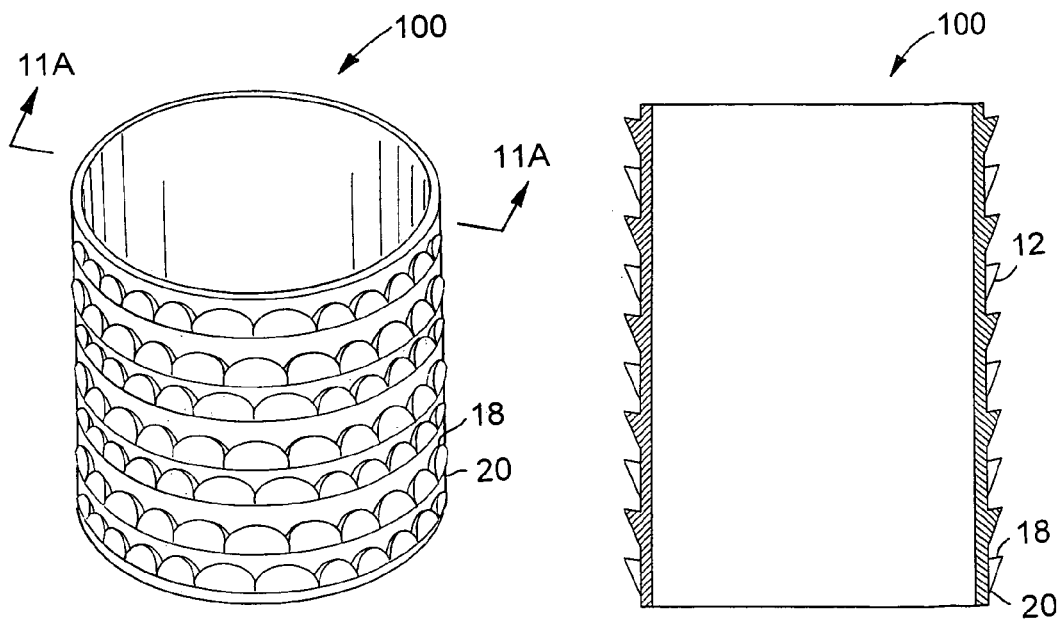
FIG. 11
FIG. 11A

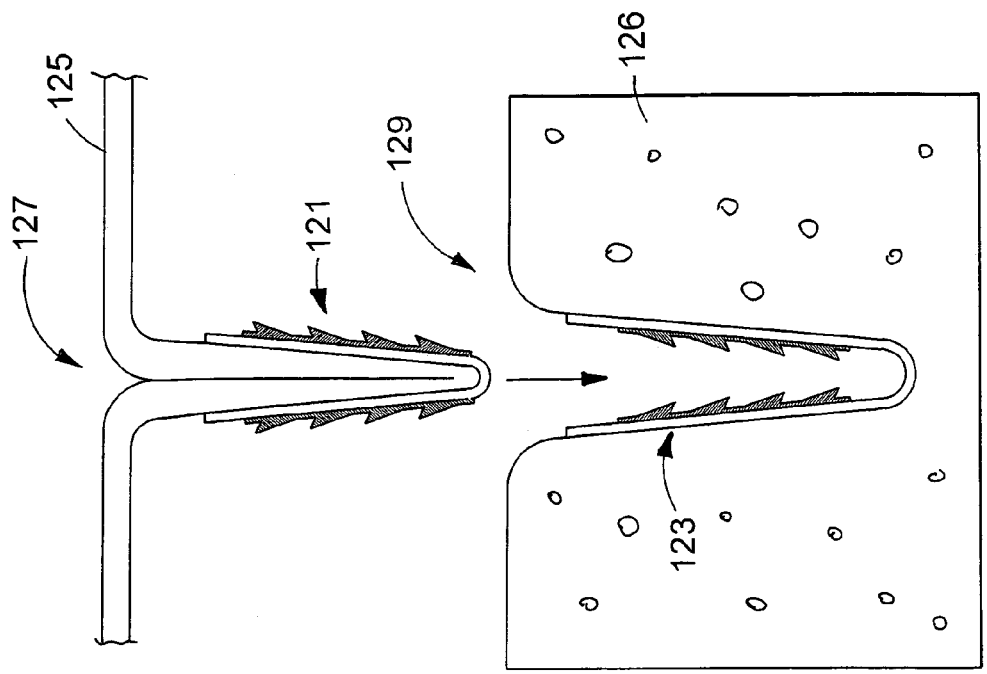
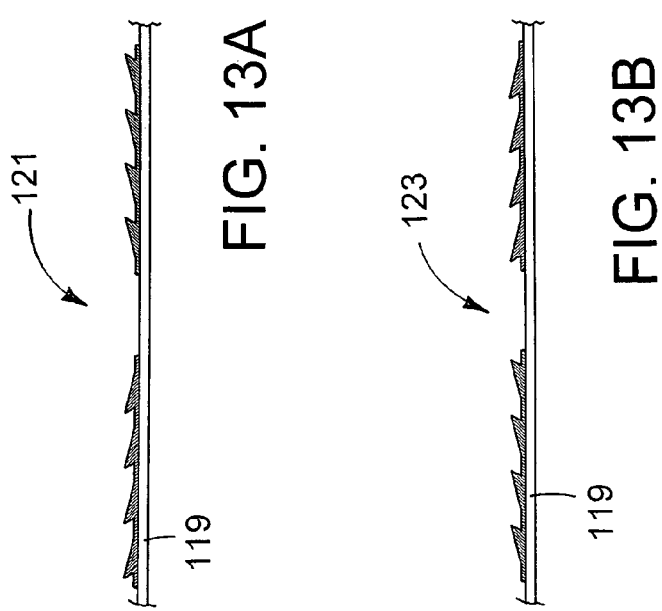

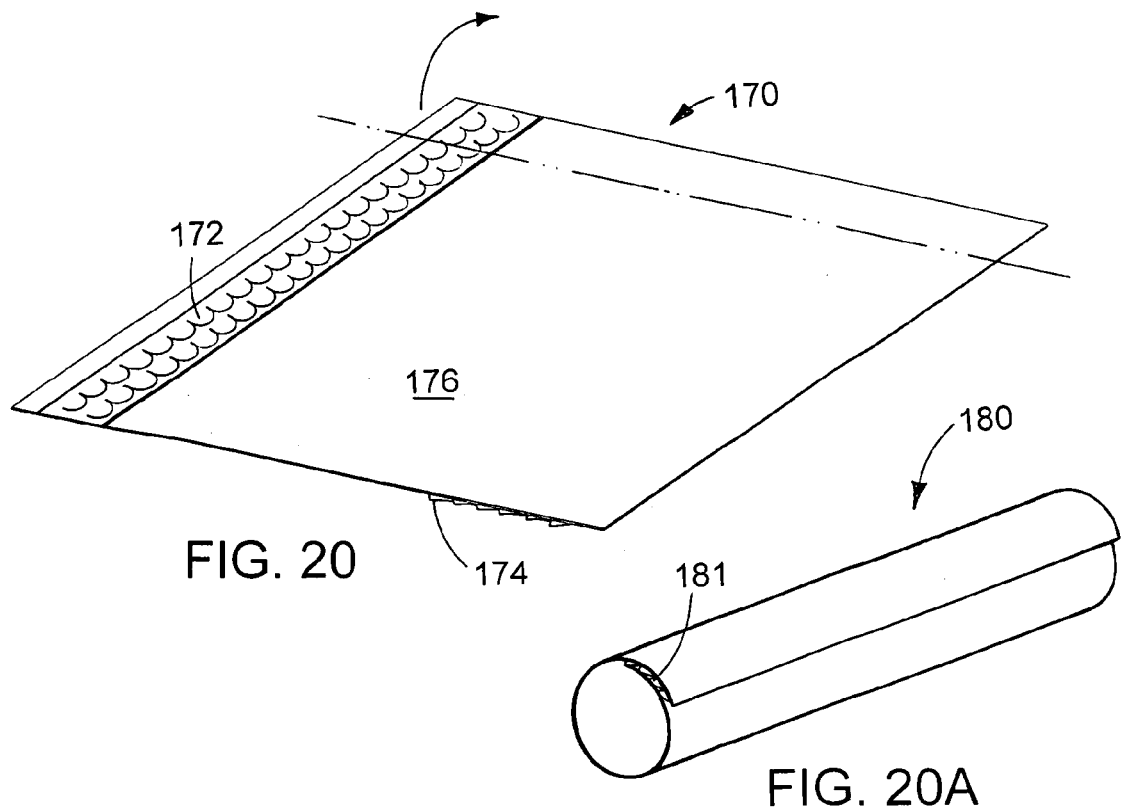
FIG. 20
FIG. 20A
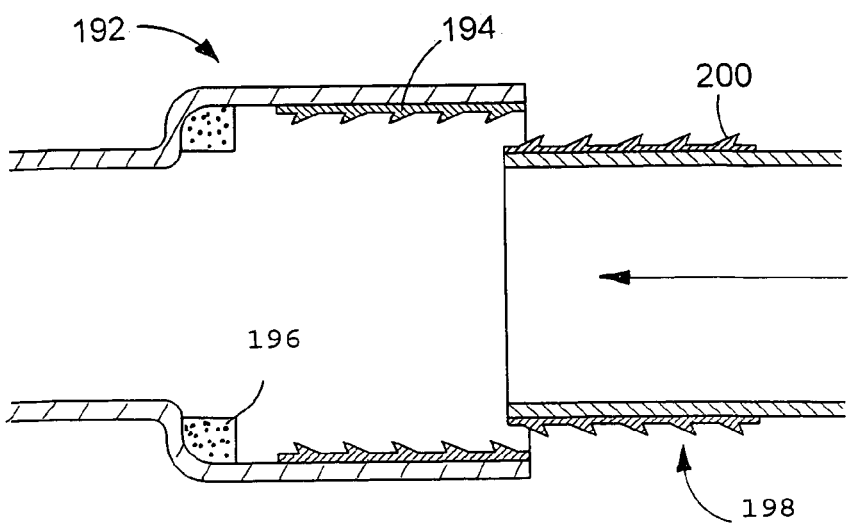
FIG. 21

SHEAR FASTENERS

TECHNICAL FIELD

This invention relates to fastener products such as those having an array of projections arranged to resist shear displacement across the surface of the fastener product.

BACKGROUNDS

Some fasteners, for example, hook and loop fasteners, include fastener components with engageable elements constructed to engage elements of corresponding fastener components. In the case of self-engaging fasteners, the fastener elements of the two fastener components are similar or the same, and the two fastener components may be regions of a single sheet.

There is a need in certain applications for fasteners that, when engaged, provide high shear strength properties in a desired direction. Some applications also require low cost fasteners offering good resistance to disengagement and in-place adjustability.

There is also a need to be able to consistently and efficiently produce fastener components having differing functional characteristics, using techniques that require limited changeover in basic tooling, yet allow for adjustments to produce the desired fastener characteristics.

SUMMARY

According to one aspect of the invention, a self-engageable fastener component includes a sheet-form base, and an array of wedge-shaped, engageable elements extending integrally from at least one side of the sheet-form base. The engageable elements each have an engageable side, and a non-engageable side conterminous at an upper edge of the element. The upper edge of each engageable element defines a curve in top view, and the engageable sides of a majority of the elements are oriented in a common direction.

In some embodiments, the engageable elements are arranged in at least one row along the sheet-form base, the row extending toward the single edge. For some applications, the elements are arranged in an array of multiple rows and columns. In preferred embodiments, the elements are arranged in multiple rows, with elements of adjacent rows offset from one another along their respective rows. The elements of adjacent rows are offset, for example, by about one-half a nominal spacing between adjacent elements within a row.

In some implementations, the curve defined by the upper edge in top view is substantially circular with a constant radius of curvature. In preferred implementations, the constant radius of curvature is from about 0.25 to 2.5 centimeters.

For some applications, the curve defined by the upper edge in top view is not circular, but is, for example, parabolic, ellipsoidal, hyperbolic, or a mixture of such curves.

In preferred embodiments, a maximum elevation of the upper edge above the top surface of the sheet-form base is between about 0.025 and 6.3 millimeters, each engageable element has a width, measured along the sheet-form base perpendicular to said single edge, of between about 0.13 and 6.3 millimeters, each engageable element has a length, measured along the sheet-form base parallel to the edge, of between about 0.13 and 2.54 centimeters, and the non-engageable side of each fastener element rises from the sheet-form base at an angle of between about 5 and 45 degrees.

In some instances, the engageable sides of the wedge-shaped elements overhang the sheet-form base, and the engageable side of each fastener element extends downward from the upper edge toward the sheet-form base at an undercut angle, measured in a midplane bisecting the fastener element and perpendicular to the sheet-form base, of between about 10 and 45 degrees.

For some applications, the engageable elements extend outwardly from two opposite sides of the sheet-form base. In some instances, there are hook-shaped projections, and/or engageable loops proximate the wedge-shaped elements.

In some implementations, the sheet-form base forms a tube, with the wedge-shaped elements extending from a curved surface of the tube. The curved surface can include an outer, or an inner surface of the tube. For some applications, the tube defines a longitudinal gap extending along its length between opposite edges of the sheet-form base. In some cases, the sheet-form base forms an elongated, U-shaped structure, and the wedge-shaped elements extend from an inside surface of the U-shaped structure, a majority of the engageable sides of the wedge-shaped elements directed away from an open edge of the U-shaped structure. In certain application, the wedge-shaped elements extend from an outside surface of the U-shaped structure.

In some embodiments, the sheet-form base forms an elongated strap. In certain instances, the elongated strap includes only a single row of said wedge-shaped elements, all arranged with their engageable sides directed toward an end of the strap. For some applications, an aperture is defined adjacent one end of the strap, and the aperture sized to receive an opposite end of the strap therethrough. In preferred embodiments, the elongated strap includes an exposed retention edge along one side of the aperture, the retention edge is positioned to engage the engageable sides of the wedge-shaped elements with the opposite end of the strap pulled through the aperture, to resist removal of the strap from the aperture.

For some applications, it is advantageous when the sheet-form base is secured to, and overlays a layer of resilient material, and the sheet-form base is flexible.

In preferred embodiments, two fastener components, each as described above, are arranged with the engageable sides of their wedge-shaped elements overlapping one another to resist shear motion between the fastener components.

According to another aspect of the invention, a method of making a fastener component includes providing a molding tool defining an array of cavities extending inwardly from an outer surface thereof. The moldable resin is transferred onto the outer surface of the molding tool, and the resin is pressed into the cavities of the molding tool, thus forming the engageable elements, while forming a base of resin on the surface of the molding tool, the base interconnecting the engageable elements. The cavities form engageable elements that are wedge-shaped, each wedge-shaped element including an engageable side, and a non-engageable side conterminous at an upper edge of the element. The upper edge of each engageable element defines a curve in top view, and the engageable sides of a majority of the elements are oriented toward a single edge of the sheet-form base.

For some applications, the molding tool includes, for example, a rotatable mold roll positioned adjacent a counter-rotating pressure roll to define a pressure nip in which the moldable resin is pressed into the cavities to form the engageable elements. In some implementations, a sheet material is introduced into the nip with the moldable resin, and laminating the moldable resin to the sheet material under pressure in the nip. The sheet material can include, for example, a scrim material.

In certain embodiments, the planar sheet material is formed into a tube, the engageable sides of a majority of the engageable elements being directed away from a common, open end of the tube.

For some applications, the fastener component is in strap form, the method includes forming an aperture at one end of the fastener component, the aperture being sized to receive an opposite end of the fastener component. The fastener component includes an exposed retention edge along one side of the aperture, the retention edge being positioned to engage the engageable sides of the wedge-shaped elements with the opposite end of the strap pulled through the aperture, resisting removal of the strap from the aperture.

According to another aspect of the invention, a seat bun includes a compliant material with a surface having a central region bounded on two opposite sides by elongated trenches, and a fastener component that includes a sheet-form base, and an array of wedge-shaped, engageable elements extending integrally from at least one side of the sheet-form base disposed within each trench. The engageable elements each have an engageable side, and a non-engageable side conterminous at an upper edge of the element. The upper edge of each engageable element defines a curve in top view, and the engageable sides of a majority of the elements are oriented in a common direction. The elements are arranged with the non-engageable sides of its wedge-shaped elements directed out of the trench. For some applications, the fastener components include elongated, U-shaped structures extending along each trench. In some instances, the fastener components comprise tubular structures embedded within each trench.

The term "curve" as used herein is intended to include generally curved outlines that may encompass minor discontinuities or straight segments.

The fastener components and fasteners disclosed herein can be particularly useful in applications requiring high shear strength. In addition to providing high shear strength, many of the fastener components and systems disclosed herein provide for ready disengagement and in-place fastener adjustability. Many embodiments can be molded in flexible form, with very low profile wedges, such that engaged sets of the fasteners occupy very little width between mating surfaces. The wedges can be arranged to allow engaged surfaces to be readily shifted for adjustment along rows of wedges, such as for adjusting the position of a picture frame fastened to a wall surface with such fasteners, for example, with the curved edges of the wedges of each row defining a series of detents for maintaining final engagement once shear load is reestablished between the wedges. The curvature of the edges helps to assist with adjustment of two mating arrays of wedges by allowing the apexes of the wedges to slide across one another without completely separating the mating fastener components, with the wedges overlapping.

The details of one or more embodiments of the invention are set forth in the accompanying drawings and the description below. Other features and advantages of the invention will be apparent from the description and drawings and from the claims.

DESCRIPTION OF DRAWINGS

FIG. 1 is a perspective view of a fastener component according to one embodiment.

FIG. 1A is an enlarged top view of a portion of the fastener component shown in FIG. 1.

FIG. 1B is an enlarged side view of a portion of the fastener component shown in FIG. 1.

FIG. 2A is a cross-sectional view of the fastener component shown in FIG. 2, taken along line 2A-2A in FIG. 2.

FIG. 2B is an enlarged view of a portion of the fastener component shown in FIG. 2A.

FIGS. 10-11 are perspective views illustrating formation of a tubular fastener component with engaging elements on the outside.

FIG. 11A is a cross-sectional view of the fastener component shown in FIG. 11, taken along line 11A-11A in FIG. 11.

FIG. 13A is a side view of a fastener component according to an embodiment.

FIG. 13B is a side view of a fastener component according to another embodiment.

FIG. 13C is a cross-sectional view of a fastener system employing the fastener components of FIGS. 13A and 13B.

FIG. 20 is a perspective view of a fastener component according to an embodiment.

FIG. 20A is a perspective view of a fastening system according to an embodiment formed from the component of FIG. 20.

FIG. 21 is an alternative fastening system.

DETAILED DESCRIPTION

Figure 1C:
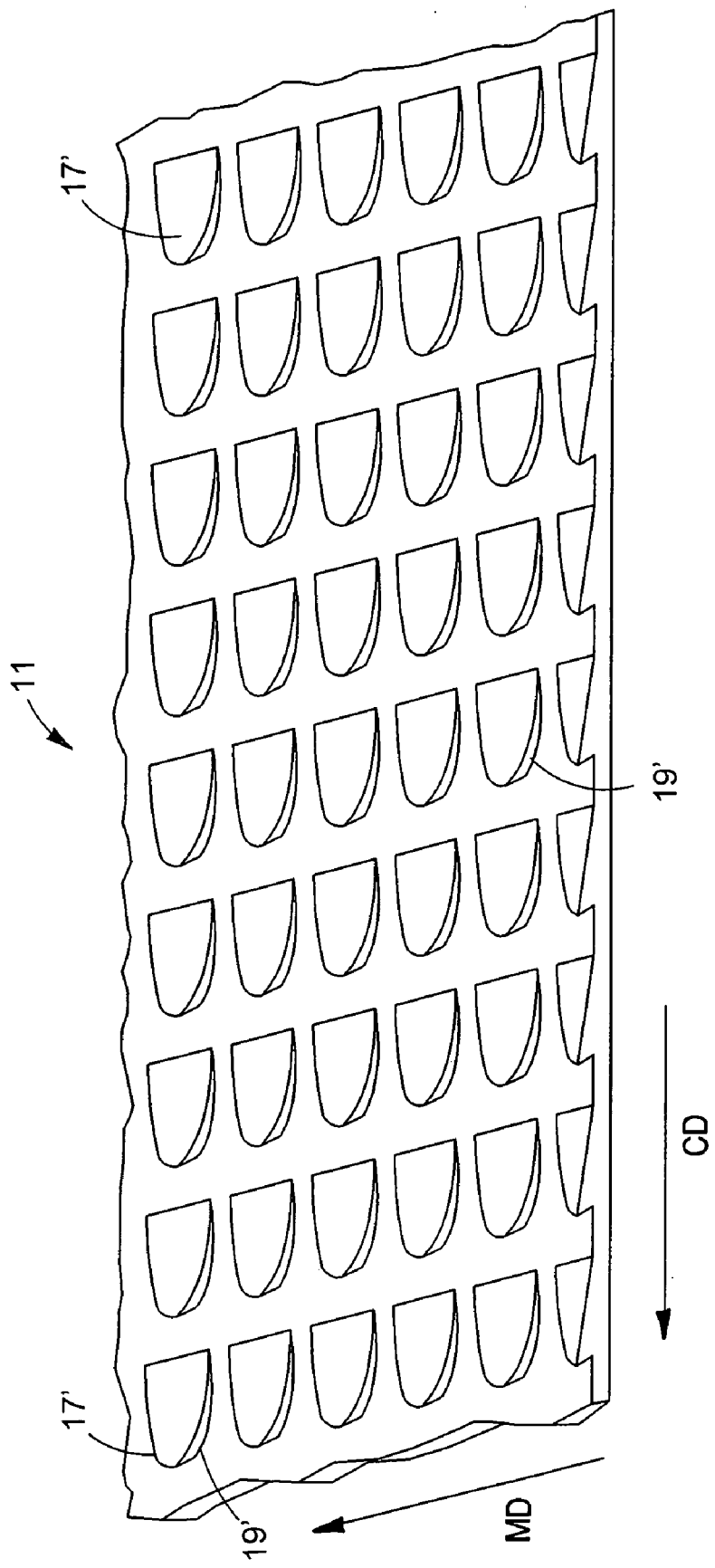
FIG. 1C is a perspective view of a fastener component according to an alternative embodiment.

Referring to FIG. 1, flexible fastener component 10 includes an array of arcuate engageable elements 12 integrally molded with and extending outwardly from one side of a solid sheet-form base 14. The engageable elements 12 are arranged in scalloped rows R, and are preferably staggered, as shown. The engageable elements 12 each include an engageable side 18 and a non-engageable side 20 disposed opposite the engageable side. Preferably, the elements are substantially identical to each other, as shown.

The engageable elements 12 may be formed by a process having a machine direction (MD) and a cross-machine direction (CD), in which case the engageable elements 12 may be arranged with rows R extending in the machine direction so that engageable sides 18 face uni-directionally in the cross-machine direction. Each engageable side 18 is defined by an upper edge 17 and by a lower edge 19 where the engageable element intersects the sheet-form base 14. Both upper and lower edges 17, 19 define curves, for example, a circular curve as shown in FIG. 1, in the direction of the rows, for example, the machine direction. A circular curve is a curve that would sweep out a circle if it continued. Because the elements 12 are staggered, the apexes A1, A2 of the arcuate engageable elements 12 in adjacent rows are offset from each other.

In some embodiments, fastener component 10 is made of thermoplastic material. Suitable thermoplastic materials include polyethylenes, polypropylenes, polyamides, PVC, and polyesters. In other embodiments, especially when high chemical resistance and/or high temperature stability is required, fastener component 10 is made of a thermoset material. Suitable thermoset materials include natural rubbers, synthetic rubbers and rigid or flexible polyurethanes.

Figure 1D:
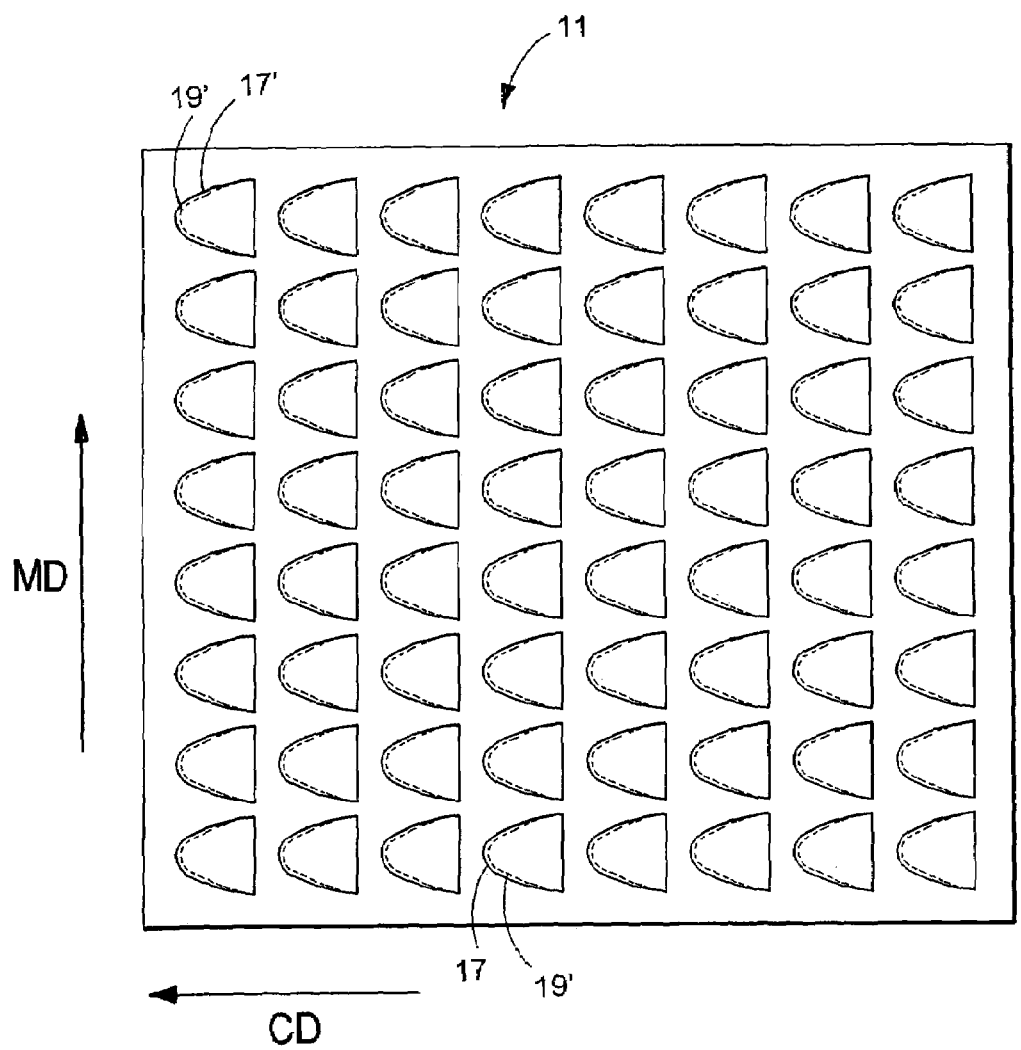
FIG. 1D is a top view of the fastener component of FIG. 1C.

In some embodiments, the upper and/or lower edge(s) 17,19 may define a circular curve with a constant radius of curvature. To illustrate this point, the radius of curvature of lower edge 19 shown in FIG. 1 is $r_{19}$, while the radius of curvature of upper edge 17 is $r_{17}$. The radius of curvature may be, for example, from about 0.1 inch to about 1 inch (0.25 cm-2.5 cm). In other embodiments, the upper and lower edges 17, 19 may define a curve that is non-circular and, therefore, has a changing radius of curvature. Examples may include curves that are parabolic ellipsoidal or hyperbolic in shape. FIGS. 1C-1D illustrate a fastener component 11 with parabolic upper and lower edges 17',19'.

In some embodiments, the maximum height H (FIG. 1) of the engageable elements 12 above the sheet-form base 14 at the apexes A1, A2 is, for example, from about 0.001 inch to about 0.250 inch (0.0025 cm-0.64 cm). In other embodiments, where the engageable elements resemble "fish scales," the height H is, for example, from about 0.001 inch to about 0.050 inch (0.0025 cm-0.13 cm). "Fish scale" engageable elements are useful, for example, when maximum flexibility is desired or when the application requires a low degree of skin irritability, for example, when the fastener component is fixed to a garment of clothing.

In some embodiments, a maximum length L of the engageable elements 12 in the direction of the rows is, for example, from about 0.05 inch to about 1.0 inch (0.13 cm-2.5 cm), while the maximum width W in the engaging direction along the sheet-form base is, for example, from about 0.005 inch to about 0.25 inch (0.013 cm-0.64 cm). In some embodiments, the spacing S between rows in the engaging direction, measured along the sheet-form base from an end of a row to the beginning of an adjacent row is, for example, from about 0.005 inch to about 0.25 inch (0.13 cm-0.64 cm).

Figure 2:
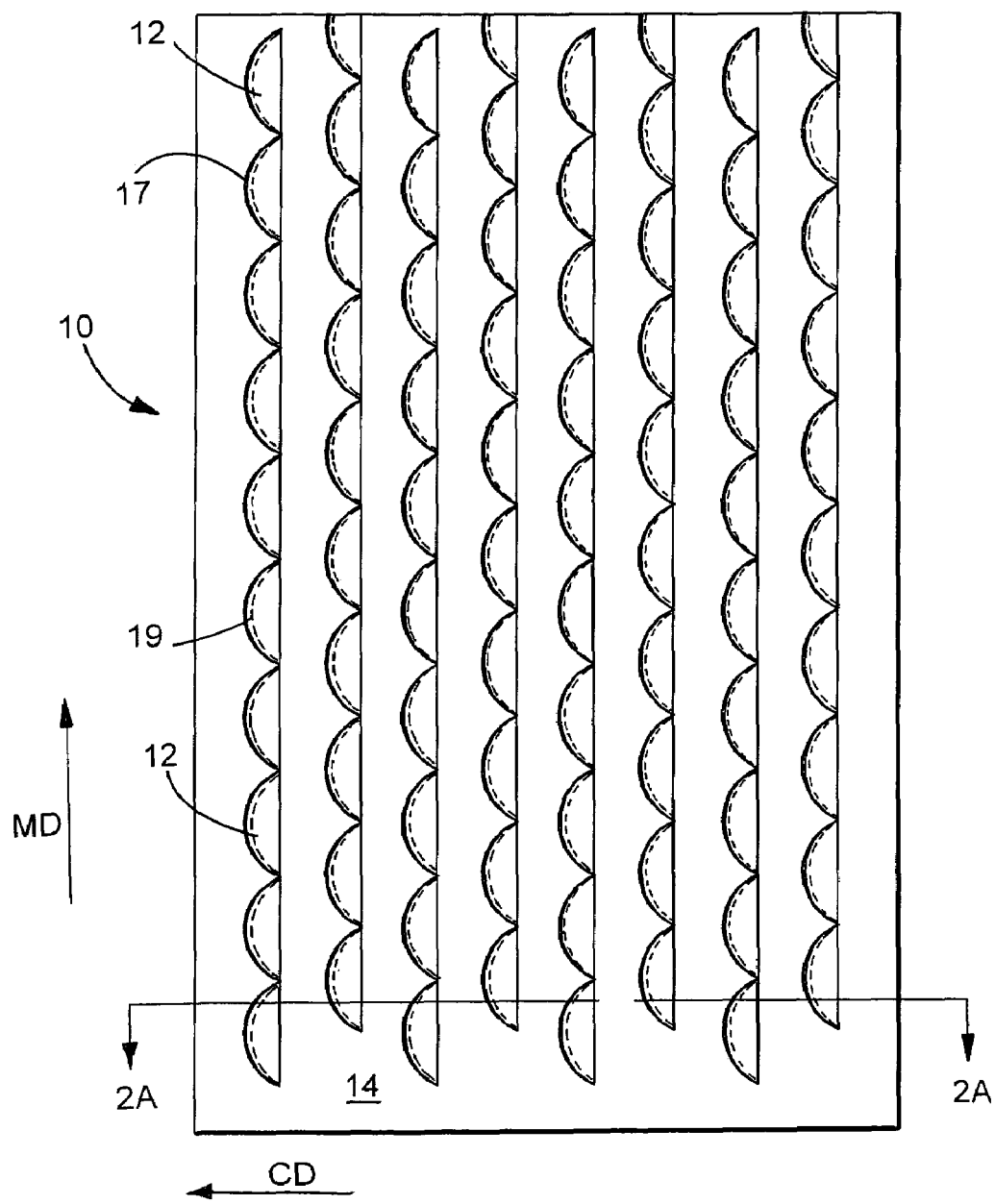
FIG. 2 is a top view of the fastener component shown in FIG. 1.

Referring to FIGS. 2-2B, each engageable element 12 defines angles α and β with respect to sheet-form base 14. Referring now particularly to FIG. 2A, angle α is the angle formed between the top surface of the sheet-form base and the top surface of the engageable element. Referring to FIGS. 2 and 2B, lower edge 19 is not directly below upper edge 17, but is offset, the offset defining an undercut angle β. Referring particularly to FIG. 2B, angle β is the angle formed between a line $L_1$ connecting upper edge 17 to lower edge 19 in a plane $P_E$ in the engaging direction (FIG. 1) that is perpendicular to the sheet-form base, and a line $L_2$ in the same plane that connects upper edge 17 to the sheet-form base. In some embodiments, angle α is, for example, from about 5° to about 45°, while angle β is, for example, from about 10° to about 45°. The presently preferred embodiment has an α angle to 30° and a β equal to 15°.

Fastener components having engageable elements like those shown in FIG. 1 are useful for engaging, for example, similar fastener components, forming a high shear strength fastener system. Applications and methods of forming the components will be discussed further below.

Figure 3:
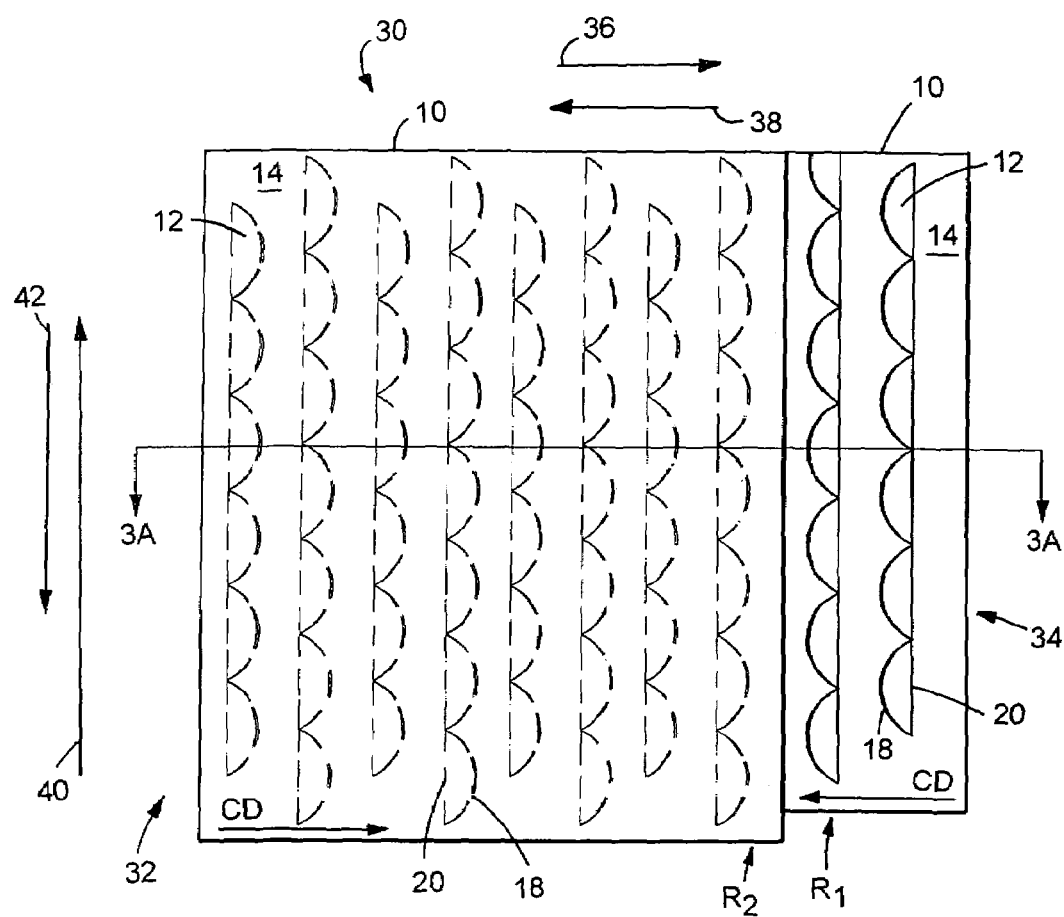
FIG. 3 is a top view of the fastener component shown in FIG. 2, the fastener component oriented such that it is engaging a like fastener component, creating a fastener according to one embodiment.
Figure 3A:
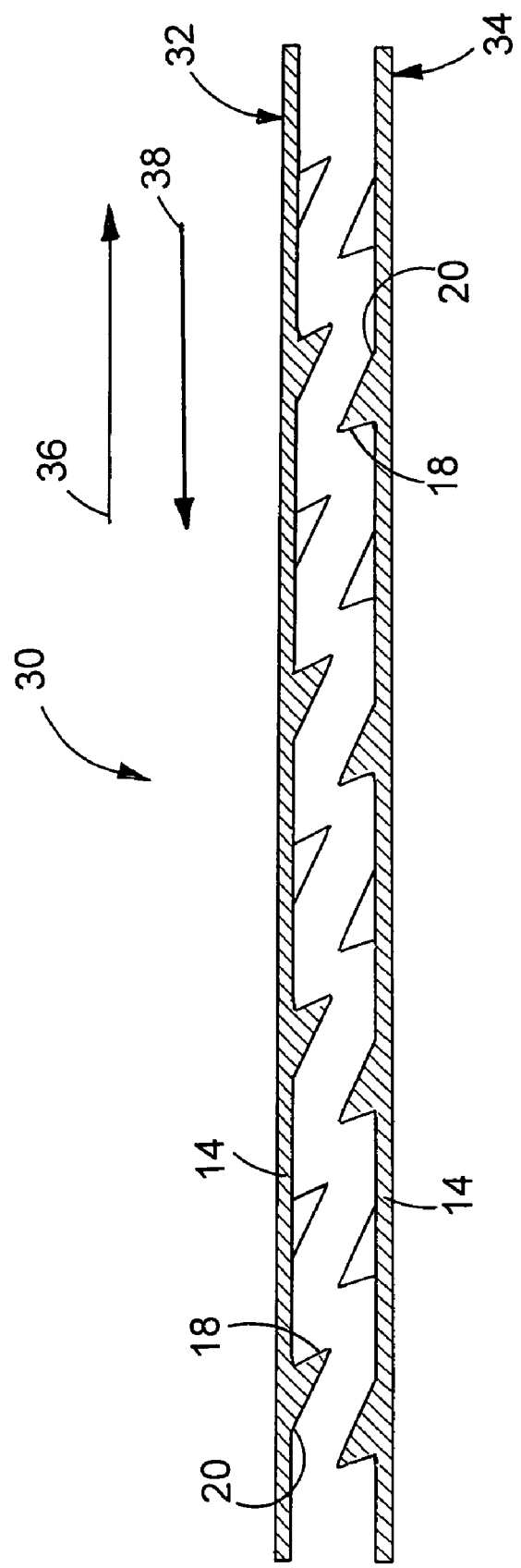
FIG. 3A is a cross-sectional view of the fastener shown in FIG. 3, taken along 3A-3A.
Figure 3B:
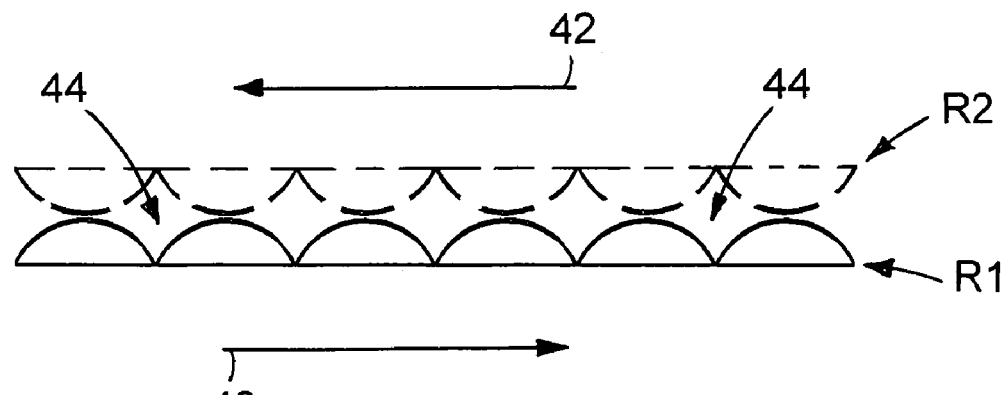
FIGS. 3B-3C are top views of a portion of the fastener system illustrated in FIG. 3.
Figure 3C:
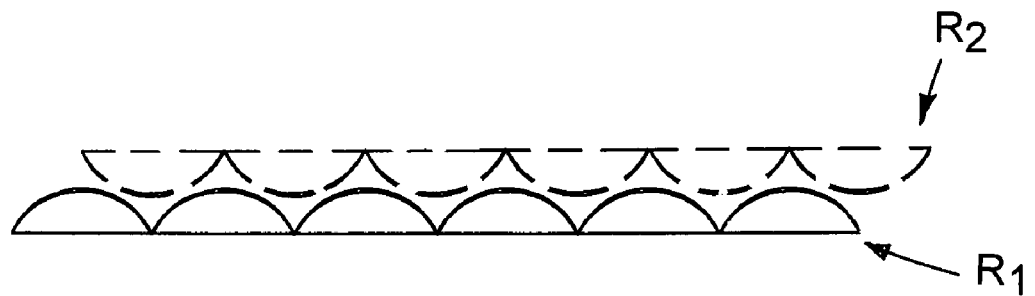

Referring to FIGS. 3-3C, a high shear fastener 30 includes two flexible fastener components 10, oriented such that the engageable elements 12 of the top fastener component 32 face the engageable elements 12 of the corresponding bottom fastener component 34. The top fastener component 32 is further oriented so that the engageable sides 18 of elements 12 point from left to right. Bottom fastener component 34 is oriented such that engageable elements 12 extend upwardly to mate with the engageable elements 12 of the top fastener component 32. The bottom fastener component 34 is further oriented so that the engageable side 18 of elements 12 point from right to left. Now, referring particularly to FIG. 3A, when the bottom fastener component 34 is fixed, and the top fastener component 32 is moved in a direction indicated by arrow 36, a high shear engagement occurs as the engageable sides 18 of the fastener elements 12 of both components restrict movement in this direction. However, when the top fastener component 32 is moved in the opposite direction, indicated by arrow 38, no engagement of the top fastener component 32 with the bottom fastener component 34 occurs and the two components slide relatively freely past each other, making a "clicking" sound as the engageable elements slide past each other. Referring back to FIG. 3, top fastener component 32 and bottom fastener component 34 are also relatively free to slide past one another in the direction in which the rows of elements extent, i.e., the directions indicated by arrows 40 and 42. Referring particularly to FIGS. 3B and 3C, which are top views of row $R_1$ engaged with row $R_2$ (FIG. 3), when row $R_1$ is fixed and row $R_2$ is moved in a direction indicated by arrow 40 or 42, there is slight resistance to movement, as engaging elements "rise up" from wells 44 (FIG. 3B) through the maximum of engageable side 18 and come to rest in adjacent wells 44 (FIG. 3C). This feature allows for in-place fastener adjustability. As an example to further illustrate adjustability, fastener component 10 may be, for example, attached to a wall in a room with the engageable side directed upwardly toward the ceiling of the room. Another fastener component 10 may be, for example, attached to the back of a shallow, heavy rectangular object, such as a picture frame with the engageable side directed downwardly. The heavy object may now be placed on the wall and held in place by the engageable elements. While still in-place on the wall, the heavy object may be translated laterally in units of length L along the wall, rising up against gravity from wells 44 and passing over each arcuate element before coming to rest in the adjacent wells as described above. Referring now to FIGS. 1 and 3A, decreasing spacing S allows for finer adjustment steps. In the example above when the heavy object is a picture frame, decreasing spacing S allows for greater adjustability (smaller steps) along the height of a wall. Referring now again to FIGS. 2A-2B and FIG. 3, increasing angle α makes it more difficult to slide components 32 and 34 past each other when oriented in the high shear mode discussed above. Increasing angle β allows for enhanced robustness in peel mode. While an angle β equal to 0° will work in shear mode, it will not provide much resistance in peel mode. In the example above where the heavy object is a picture frame, the robustness translates into how easy it is to accidentally cause the picture frame to fall off the wall by bumping the frame in a direction perpendicular to the wall to which it is attached.

Figure 4:
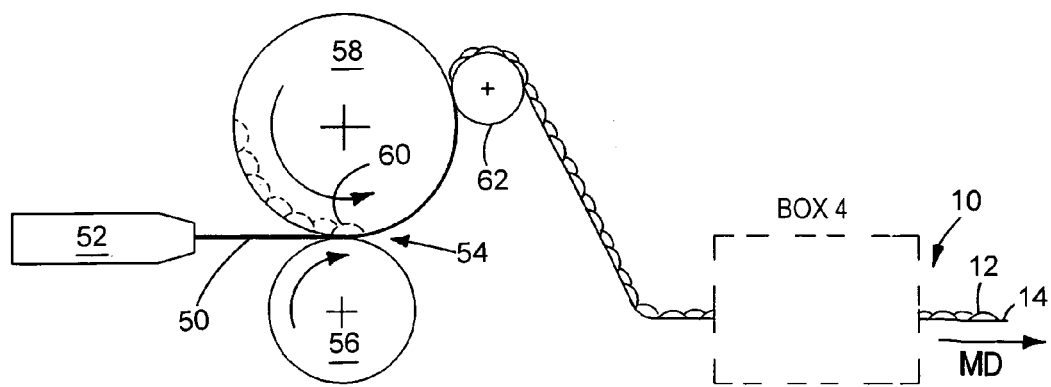
FIG. 4 is a diagrammatic view of a process for making the fastener component shown in FIG. 1.

Referring now to FIG. 4, a process for forming the fastener component 10 shown in FIG. 1 is illustrated. Thermoplastic resin 50 from extruder 52 is introduced into nip 54 formed between a supporting pressure roll 56 and a mold roll 58. Pressure in the nip causes thermoplastic resin 50 to enter blind-ended forming cavities 60 of mold roll 58 while excess resin remains about the periphery of the mold roll and is calendared to form sheet-form base 14. As the rolls 56, 58 rotate in opposite directions (shown by arrows), the thermoplastic resin proceeds along the periphery of the mold roll until it is stripped by stripper roll 62. The resulting fastener component 10 is described above. The direction of travel of the material illustrated in FIG. 4 is referred to as the "machine direction" (MD) of the material and defines the longitudinal direction of the resulting product 10, while the cross-machine direction (CD) is perpendicular to the machine direction. Further details regarding processing are described in Fischer, U.S. Pat. No. 4,775,310, the disclosure of which is hereby incorporated in full by reference.

Figure 5:
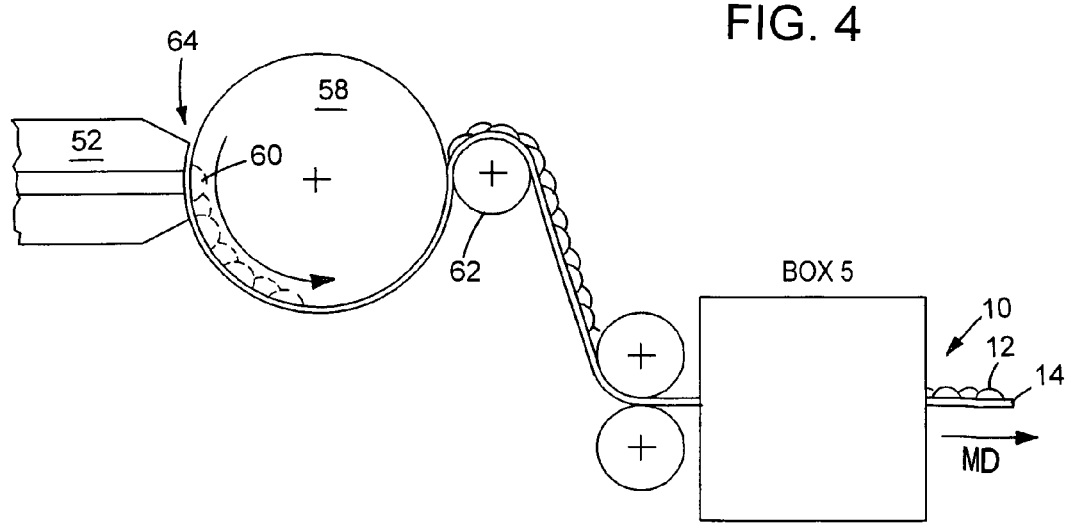
FIG. 5 is a diagrammatic view of an alternative process for making the fastener component shown in FIG. 1.

In another embodiment, illustrated in FIG. 5, an alternate technique for producing fastener component 10 of FIG. 1 is employed. The process is similar to that described above with reference to FIG. 4, except only a mold roll 58 is used, i.e., no pressure roll 56 is necessary. Here, the extruder 52 is shaped to conform to the periphery of the mold roll and the extruded resin 50 is introduced directly to a gap 64 formed between the mold roll and the extruder 52. From here, flexible fastener component 10 is stripped from the mold cavities 60 by stripper roll 62 as described above. Further details regarding this process are described by Akeno in U.S. Pat. Nos. 5,781,969 and 5,913,482, the disclosures of which are hereby incorporated in full by reference.

Figure 4A:
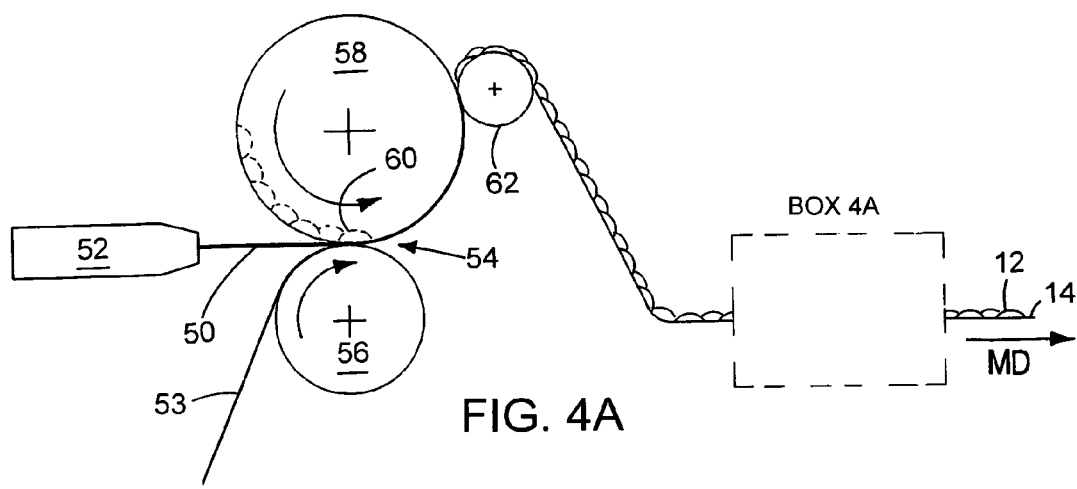
FIG. 4A is a diagrammatic view of a process for making a fastener component shown in FIG. 4B or 4C.
Figure 4B:
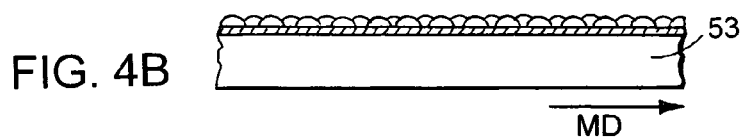
FIG. 4B is a laminated fastener component made by the process shown in FIG. 4A.
Figure 4C:
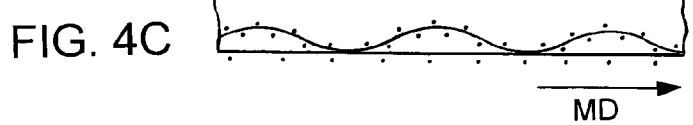
FIG. 4C is a fastener component made by the process shown in FIG. 4A using a scrim web material.

Referring now to FIGS. 4A-4C, a process for forming fastener components bonded to a web material is illustrated. Web material 53 is brought into nip 54 formed between roll 58 and roll 56 as discussed above. Web material can be, for example, a relatively non-porous material such as a plastic sheet material or a relatively porous textile gauze material such as a scrim material. If the web material is relatively non-porous, fastener components like that of FIG. 4B result. If the web material is a relatively porous material, fastener components like that of FIG. 4C result, as the molten resin penetrates the pores of the scrim material. Depositing molten resin upon a scrim material is discussed in U.S. patent application Ser. No. 10/688,301, filed Oct. 15, 2003, the entire content of which is hereby incorporated by reference.

Other processes for forming flexible fastener component 10 are possible. For example, the processes described by Jens, U.S. Pat. No. 6,432,339, the disclosure of which is hereby incorporated in full by reference. In yet another process, flexible fastener component 10 may be formed from sheets of a pre-form material that may be, for example, pre-heated and compression molded, the heat and the pressure forming the engageable elements 12. The advantage of this type of processing may be, for example, the use of flat, inexpensive tooling and the use of a relatively inexpensive hydraulic press. Another advantage of the compression molding process is that it allows for the use of thermoset resins that offer, for example, higher temperature stability and better chemical resistance when compared to thermoplastic materials. The disadvantage of this type of processing may be, for example, relatively low throughput since it is a batch process instead of a continuous process.

Figure 4D:
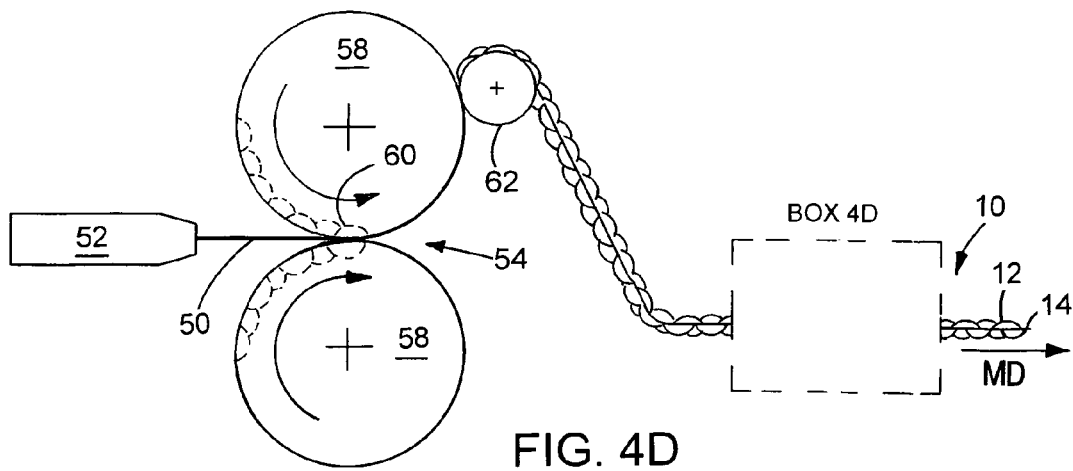
FIG. 4D is a diagrammatic view of a process for making a fastener component with engageable elements on both sides of a sheet-form base.

Referring to FIG. 4D, a process for forming fastener components with engageable elements on both sides of a sheet-form base is illustrated. Thermoplastic resin 50 from extruder 52 is introduced into nip 54 formed between two mold rolls 58. Pressure in the nip causes thermoplastic resin 50 to enter blind-ended forming cavities 60 of mold rolls 58, forming a double-sided fastener component.

Referring now specifically to Box 4, Box 4A, Box 4D and Box 5 of FIGS. 4, 4A, 4D and 5, respectively, additional post processing may be applied to fastener components. For example, Boxes 4, 4A, 4D and 5 may represent "flat-topping" stations as described by Provost in U.S. Pat. No. 5,953,797, the disclosure of which is hereby incorporated in full by reference. Flat-topping can, for example, increase the peel strength of fastener systems by increasing the overhang of the engageable elements.

Figure 6:
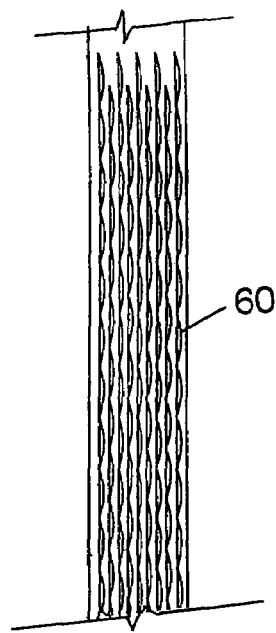
FIG. 6 is a diagrammatic top view of a portion of flat tooling.

Referring now to FIG. 6, flat tooling can be machined to create, for example, a compression mold tool. The advantages of compression molding fastener components have been described above. Cavities 60 can be machined or burned (e.g., by EDM) into the tool. Other methods for forming cavities are known in the art.

Figure 7:
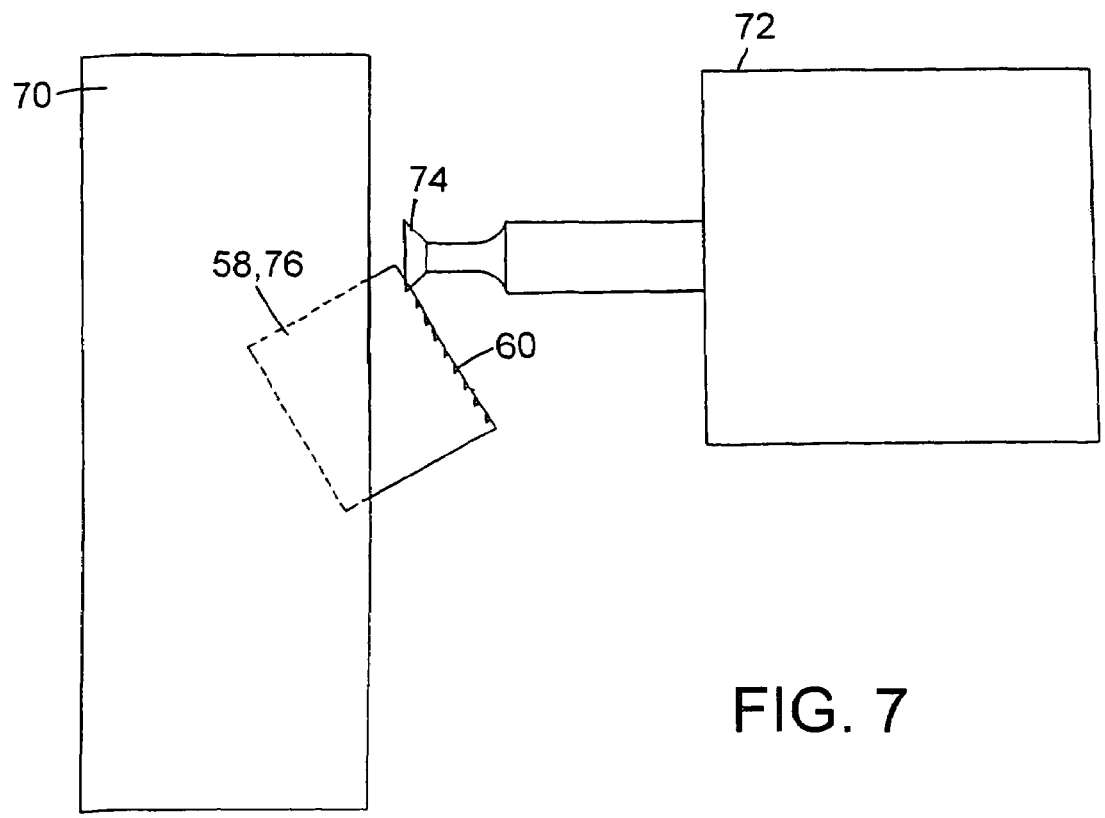
FIG. 7 is a cross-sectional view of a tool roll being cut.

Referring to FIG. 7, entire mold rolls 58 or large portions 76 thereof can be machined by holding mold roll 58 on table 70 and machining its surface, for example, with a CNC milling machine 72 to form cavities 60. The milling machine may include, for example, a dovetail cutter 74. In comparison to forming mold rolls from machined plates, this process has the advantage, for example, of fewer parts to assemble. In addition, this process can allow for, for example, less expensive tooling, faster tooling changeover, easier tool cleaning and may eliminate or reduce flashing.

Figure 7A:
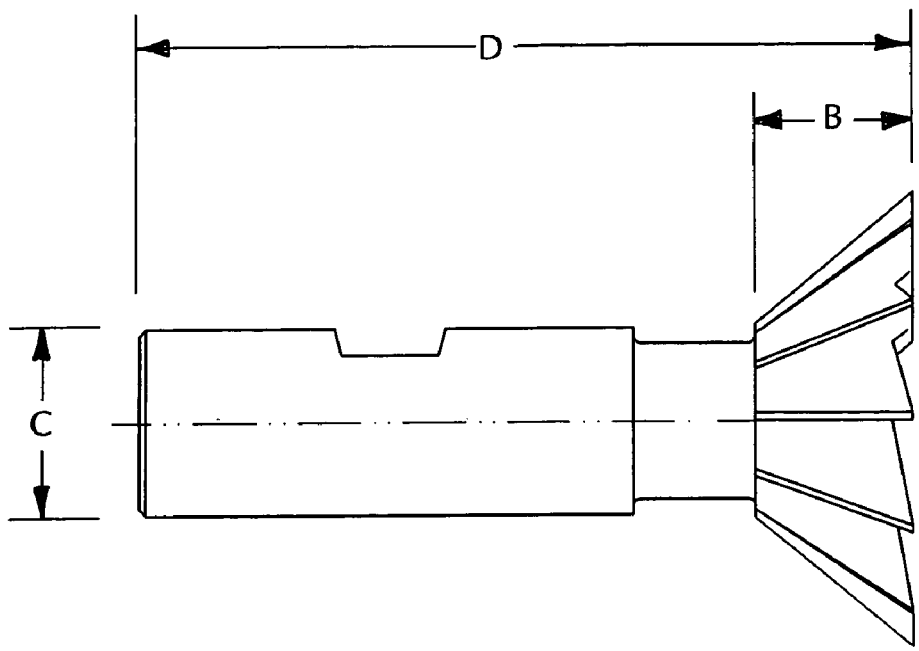
FIG. 7A is a side view of a dovetail cutter.
Figure 7B:
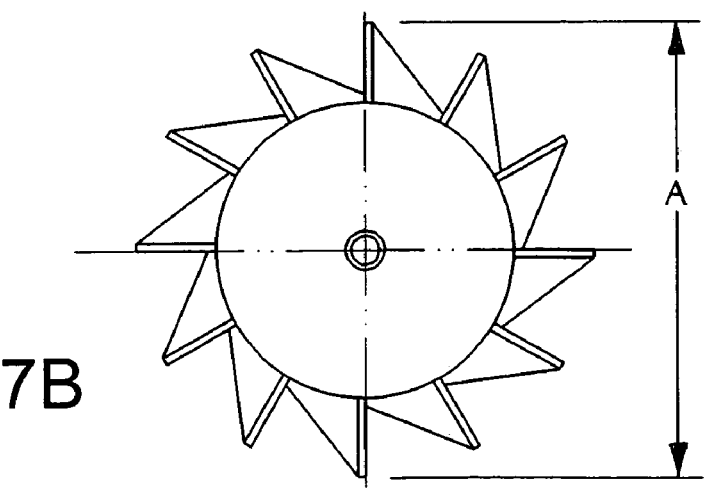
FIG. 7B is an end view of a dovetail cutter.

FIGS. 7A-7B show, a dovetail cutter 74 suitable for making the tooling described above. The geometry of cutter 74 can be described in terms of cutter diameter A, face width B, shank diameter C, overall length D and included angle φ. Suitable cutters may have, for example, the following dimensions:

| DIMENSION | RANGE |
| --- | --- |
| A | 0.125 inch-3.000 inch (0.318 cm-7.62 cm) |
| B | 0.125 inch-2.000 inch (0.318 cm-5.08 cm) |
| C | 0.125 inch-1.500 inch (0.318 cm-3.81 cm) |
| D | 1.500 inch-4.000 inch (3.81 cm-10.16 cm) |
| φ | 30-60° |

Figure 8:
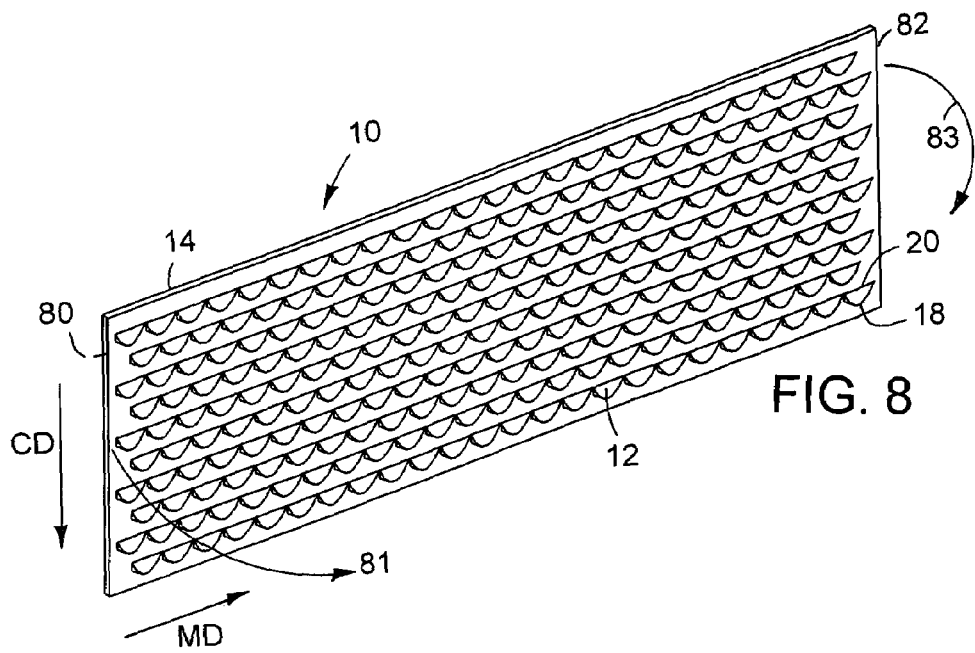
FIGS. 8-9 are perspective views illustrating formation of a tubular fastener component with engaging elements on the inside.
Figures 9, 9A:
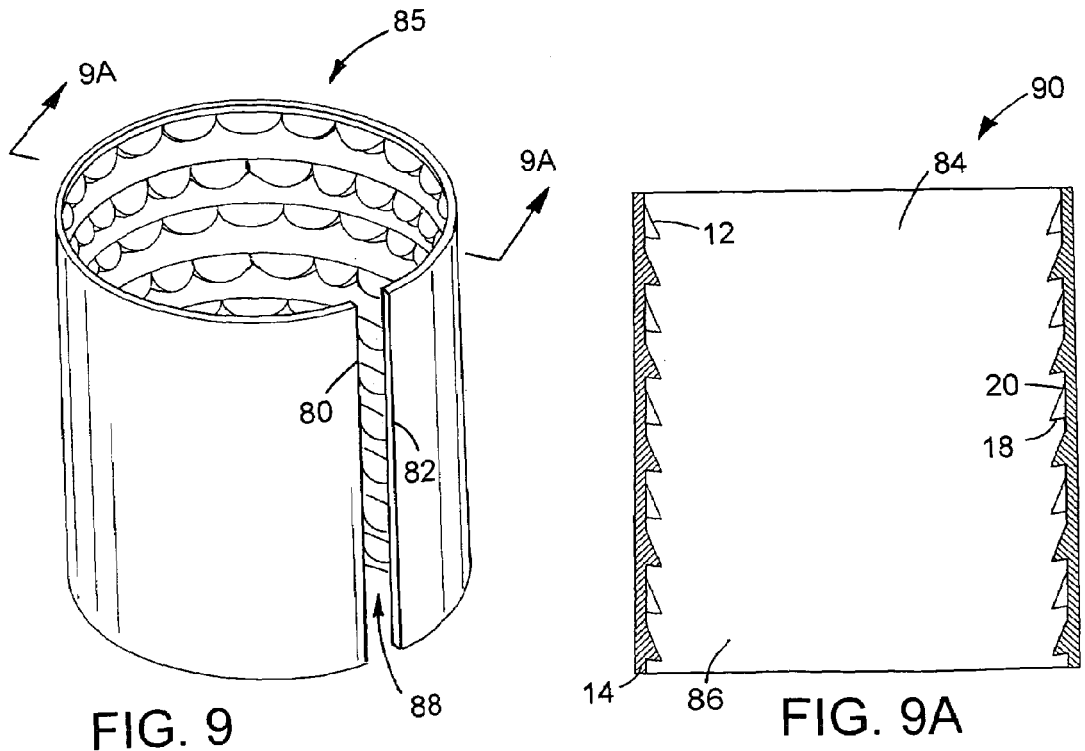
FIG. 9A is a cross-sectional view of the fastener component shown in FIG. 9 (after joining), taken along line 9A-9A in FIG. 9.

Referring to FIGS. 8-9A, a tubular fastener component is made wrapping proximal end 80 and distal end 82 of fastener component 10 toward each other, as indicated by arrows 81 and 83, until ends 80 and 82 physically touch or only a small gap 88 remains. Joining touching ends 80 and 82 can be accomplished by using, for example, an impulse sealer or an ultrasonic welder. In other embodiments, ends 80 and 82 may be joined by filling gap 88 with an elastomeric adhesive. This method can be particularly advantageous when a flexible joint is desired. A flexible joint may be desired, for example, when the tubular structure is placed on an oversized member (not shown), for example, an insert in a reactive injection mold or injection mold. Tubular fastener component 90 includes a first open end 84 and a second open end 86. In another embodiment, the shape of the tubular fastener is fixed in the shape shown in FIG. 9 (i.e., gap is not closed) by heating the sheet-form base on the side opposite the engageable elements, and then holding in the shown configuration until the sheet-form base cools, thereby permanently setting the shape of FIG. 9. This embodiment acts like a "spring" in that it the fastener component has radial flex which allows the fastener component to be placed onto over-sized objects, for example, protrusions in molds with a larger diameter than the fastener component.

Referring to FIGS. 10-11A, tubular fastener component 100 may be formed by orienting flexible fastener component 10 so that the engageable elements 12 will extend on an outer surface of the finished tubular fastener component. The ends of fastener component 10 are then wrapped and joined as described above.

Figure 12:
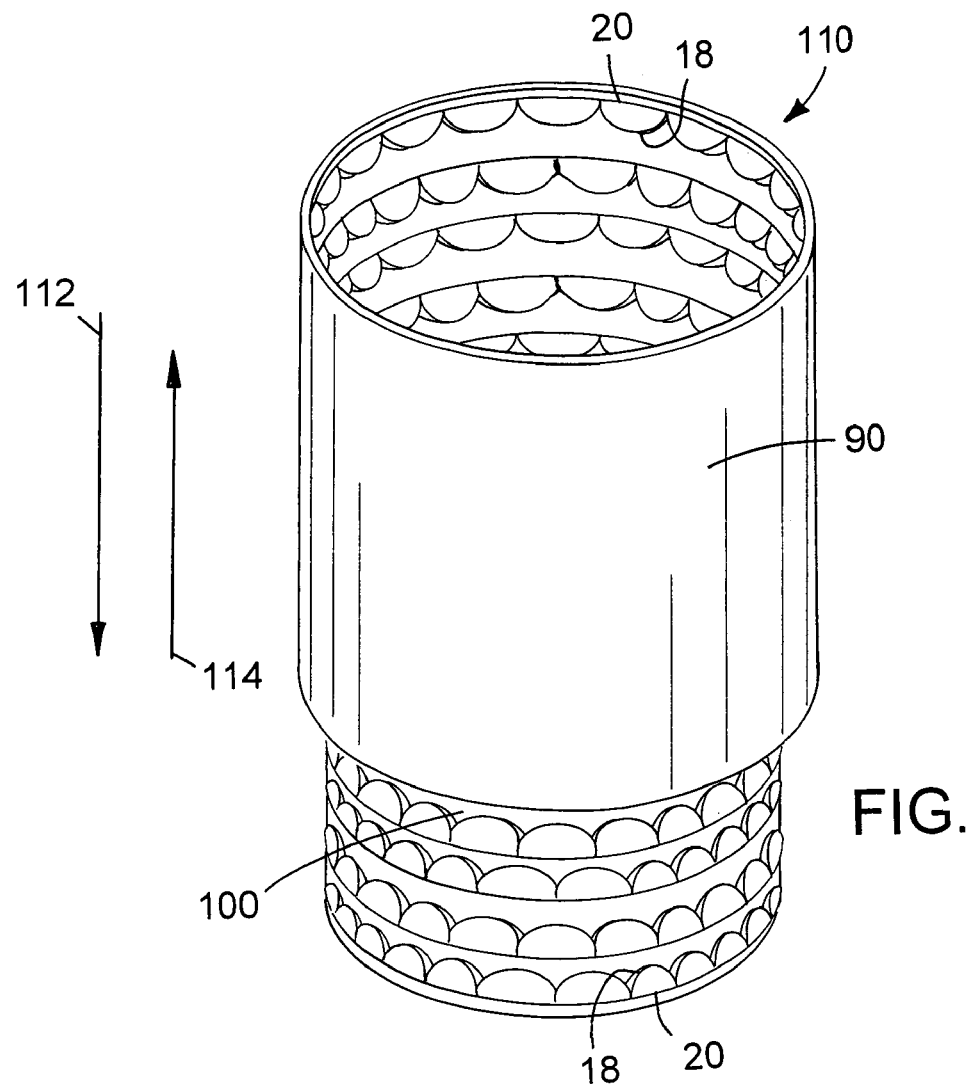
FIG. 12 is a perspective view of a tubular fastener system employing the tubular fastener components shown in FIGS. 9 and 11.

Now referring to FIG. 12, fastener system 110 includes tubular fastener component 90 and tubular fastener component 100, sized such that the fastener component 100 fits inside of fastener component 90. To more fully appreciate and understand the operation of the fastener system 110, imagine fastener component 90 fixed in space, for example, extending from a molded part. Fastener component 100 is substantially free to move over fastener component 90 in a direction indicated by arrow 112. However, when the fastener component 100 is moved in the opposite direction as indicated by arrow 114, a high shear strength engagement results as the engageable sides 18 of engageable elements 12 of both tubular fastener components 90 and 100 restrict movement in this direction.

Figure 14:
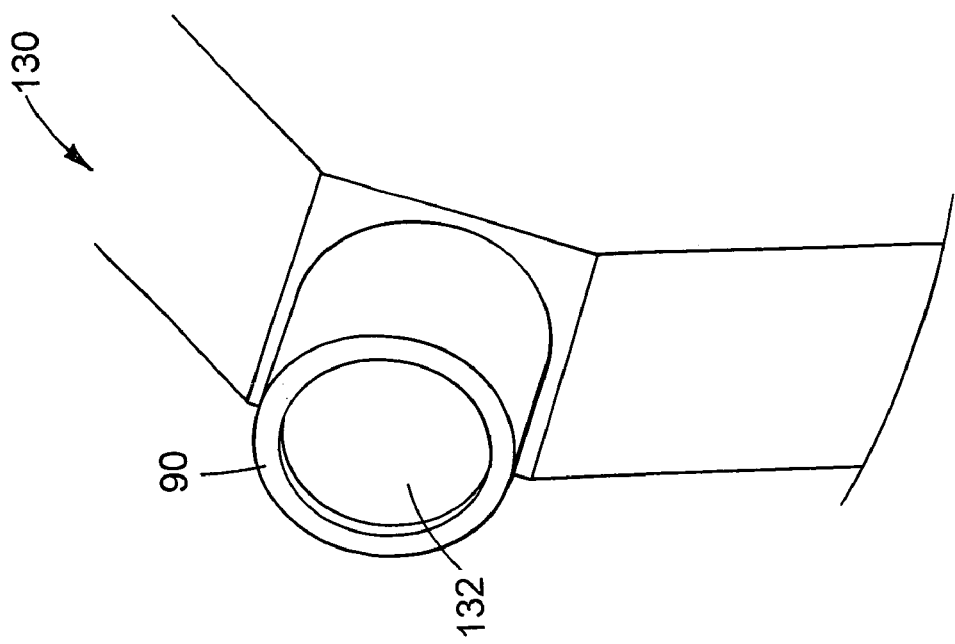
FIG. 14 is a perspective view of a mold insert illustrating the tubular fastener component of FIG. 9 (after joining) on a protrusion.
Figure 13:
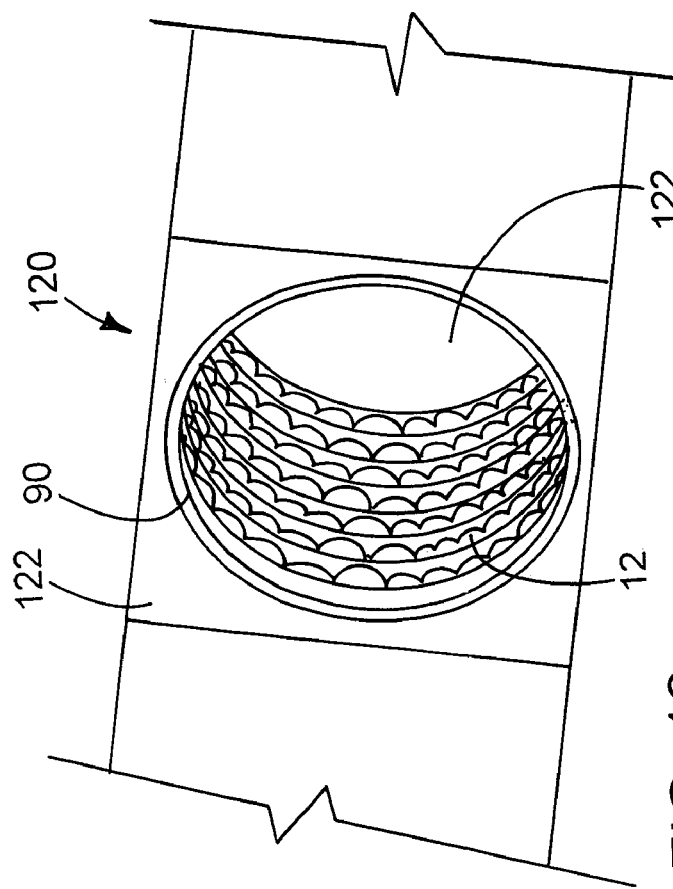
FIG. 13 is a perspective view of the tubular fastener component shown in FIG. 9A in a plastic body.

Referring to FIG. 13, a molded-in fastener component 120 is made by embedding tubular fastener component 90 in plastic 122. This is done by placing tubular fastener component 90 on protrusion 132 of a mold insert 130, for example, as shown in FIG. 14, with engageable elements 12 adjacent the outer surface of protrusion 132. Mold insert 130 may be a component, for example, of an injection mold or a reaction injection mold (not shown). The plastic 122 that embeds the tubular fastener component 90 may be, for example, a thermoplastic or a thermoset. In order to keep tubular fastener component 90 on protrusion 132 during cycling of the mold, it can be advantageous to fill the thermoplastic resin 50 (FIG. 4) that will form fastener component 90 with a magnetic material. Further details about filling thermoplastic resin with magnetic materials, for example, a ferro-magnetic filler, are described by Pollard, U.S. Pat. No. 5,945,193, and Kenney, U.S. Pat. No. 6,129,970, the disclosures of which are hereby incorporated in full by reference herein. When tubular fastener components, such as component 90 of FIGS. 13 and 14, are molded into a substrate, e.g., a foam bun, the height H of the engageable elements is generally minimized to avoid excessive longitudinal intrusion of material into inner portions of the tubular structure. To prevent intrusion, preferably, elements have a maximum height of less than 0.025 inch (0.635 mm), e.g., 0.010 inch (0.254 mm), or less, e.g., less than 0.005 inch (0.127 mm).

Referring to FIG. 14A, and back again to FIG. 14, in addition to minimizing the height of the engageable elements, another way to minimize intrusion of material longitudinally into inner portions of the tubular structure is to provide a mold protrusion 303 that includes a distal end portion 306 with a diameter larger than a nominal diameter the tubular structure 305. The tubular structure 305 has an engageable element-free region 307 that seals against distal end portion 306. The proximal end of protrusion 303 contains a tapered portion 309 for sealing the opposite end of tubular structure 305. Distal end portion 306 of protrusion 303 includes a tapered lead-in 313, and a tapered lead-off 311 to allow fastener component 305 to be easily placed onto, and removed from protrusion 303.

Figures 14A, 14B:
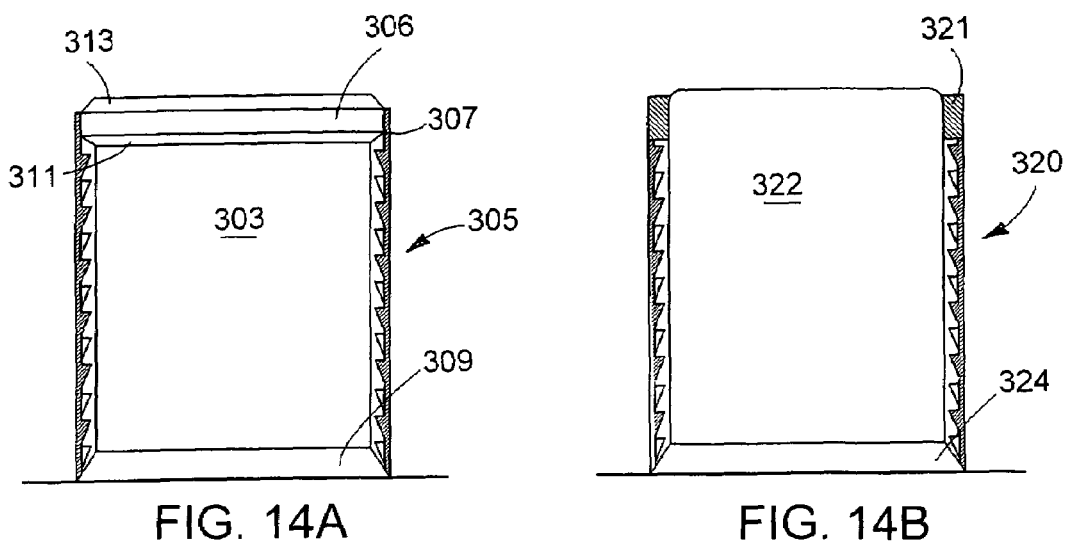
FIG. 14A is a cross-sectional view of a tubular fastener component on a mold protrusion, a portion of the mold protrusion having a diameter larger than the nominal diameter of the fastener component, and the tubular fastener component including a region without engageable elements.
FIG. 14B is a cross-sectional view of a tubular fastener component on a mold protrusion, the fastener component including a seal about an inner surface of the tubular structure.

Referring to FIG. 14B, another way to minimize intrusion of material longitudinally into inner portions of a tubular structure is to provide a tubular fastener 320 that includes a resilient material, e.g., an elastomer, that forms a seal 321 at a distal end of the fastener component. The proximal end of the tubular structure 320 is sealed by tapered portion 324 on protrusion 322, as discussed above.

Figure 14C:
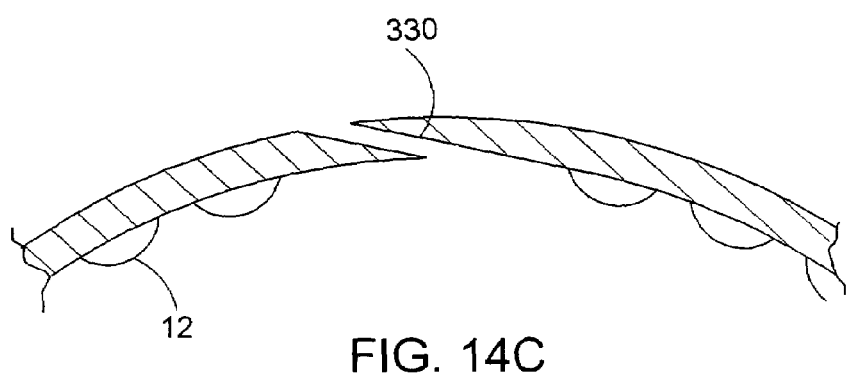
FIG. 14C is a cross-sectional view of a portion of a tubular fastener component showing overlapped edges that are tapered in thickness.

Radial intrusion of material into inner portions of a tubular structure can be minimized, for example, by longitudinally sealing the tubular structure with an elastomer, or by thermally fusing previously opposite edges. Referring to FIG. 14C, another method of preventing radial intrusion of material includes overlapping opposite tapered edges 330. Additional methods of preventing intrusion, and of attaching a fabric cover to a seat cushion, are discussed in "FASTENERS," filed concurrently herewith, and assigned U.S. Ser. No. 60/547,212, the disclosure of which is hereby incorporated in full by reference, herein.

Referring to FIGS. 13A-13C, a fastener component, for example, fastener component 10 of FIG. 1, is fixed upon support 119 by, for example, using an adhesive, sewing or employing the process for forming fastener components bonded to web materials discussed above. Depending upon how the fastener component is oriented on support 119, fastener components 121 and 123 of FIGS. 13A and 13B, respectively, can result. Fastener component 127 results from fixing fastener component 121 upon a support 125, for example, by stitching. Similarly, fastener component 129 is formed by fixing component 123 onto a foam support 126 by, for example, using adhesive or integrally molding component 123 onto 126. Pushing component 127 into component 129 creates a high shear fastening system. Support 125 may be, for example, a fabric cover and foam support 126 may be, for example, a foam bun that serves as a seat. Various methods of attaching a fabric cover to a seat cushion are described in Roberts, U.S. Pat. No. 5,964,017, Wildem et al., U.S. Pat. No. 5,605,373 and Angell, U.S. Pat. No. 5,499,859, the entire disclosure of each of which is hereby incorporated in full by reference.

Figure 15:
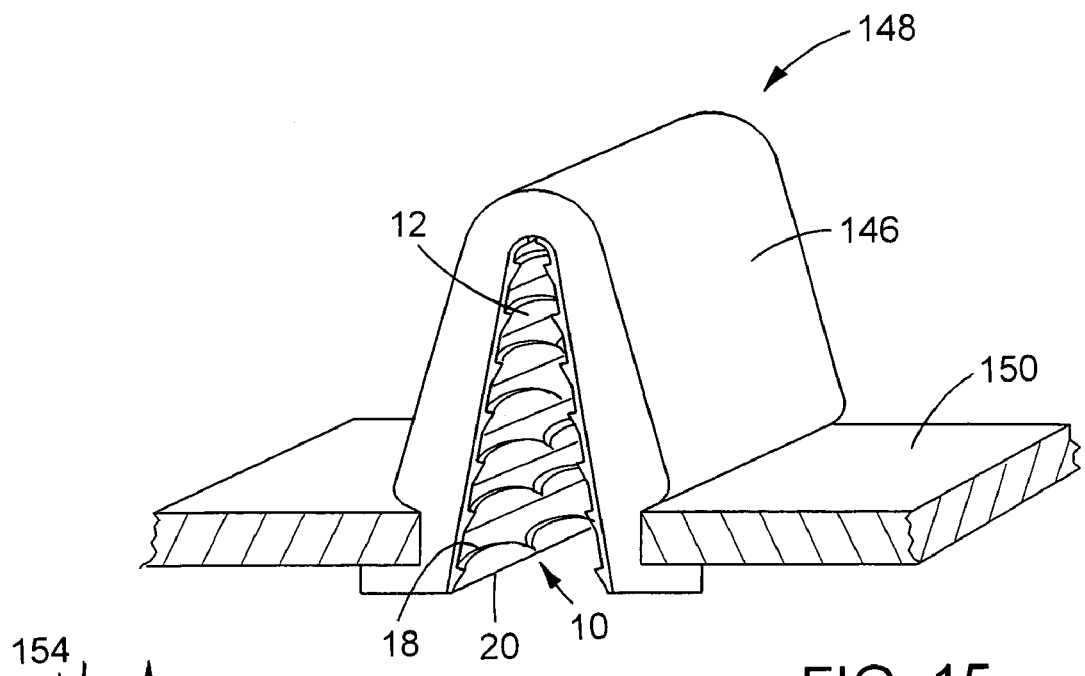
FIGS. 15-16 are perspective views of alternative fastener components employing the fastener component shown in FIG. 1.
Figure 16:
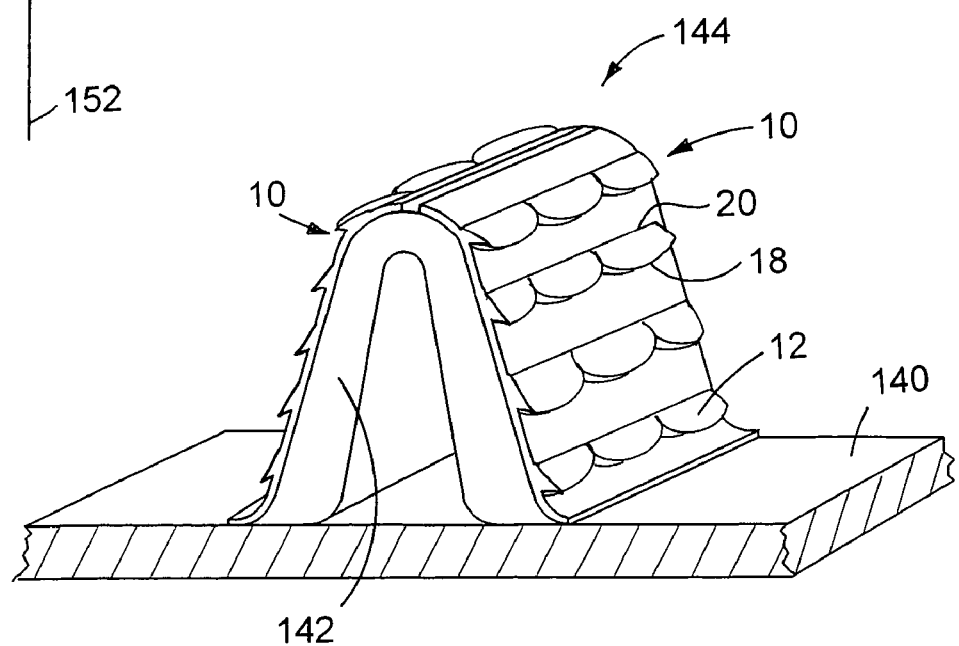

Referring to FIGS. 15-16, another fastening system is illustrated for joining two sheet materials, for example, attaching an extruded plastic stud 140 to a sheet of metal 150. Referring particularly to FIG. 16, extruded stud 140 has a plastic male component 142 that is integral with and extends outwardly from one side. While only one male component 142 is shown, plastic stud 140 may have a plurality of such male components 142. Male component 142 may be formed by extrusion during the same process as making plastic stud 140 or male component 142 may be, for example, adhesive bonded at a later time. Flexible fastener component 10 that is, for example, adhesive-backed is applied to both sides of the plastic male component 142 such that the engageable sides 18 of each of the engageable elements 12 point generally in an downwardly direction, creating male fastener assembly 144. As an alternative process, male fastener assembly 144 may be, for example, molded as a single, unitary component. Referring particularly to FIG. 15, sheet metal female assembly 148 includes an extruded plastic female member 146 attached to sheet metal 150. While only one female member 146 is shown, sheet metal 150 may be attached to a plurality of such components. In addition, female member 146 may be formed, for example, by extrusion and can, therefore, be of considerable length. Flexible fastener component 10 that is, for example, adhesive-backed is applied to both sides of the plastic female member 146 such that the engageable side 18 of each of the engageable elements 12 point generally in an upwardly direction, creating female fastener component 148. In an alternative embodiment, female fastener assembly 148 may be, for example, molded as a single, unitary component. Referring now to both FIGS. 15 and 16, to attach extruded plastic stud 140 to sheet metal 150, male assembly 144 is moved in direction indicated by arrow 152 while keeping female assembly 148 fixed in place. A high shear strength engagement occurs and high force needs to be applied in a direction indicated by arrow 154 to disassemble male assembly 144 from female assembly 148.

Figure 17:
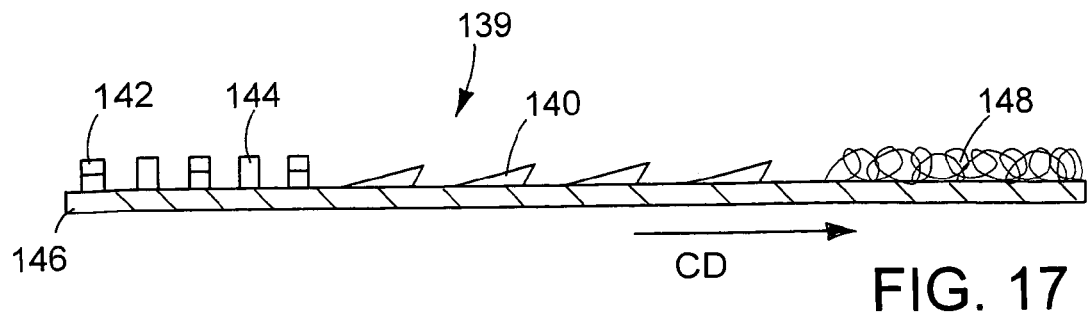
FIG. 17 is a side view of a fastener component according to an embodiment.
Figure 18:
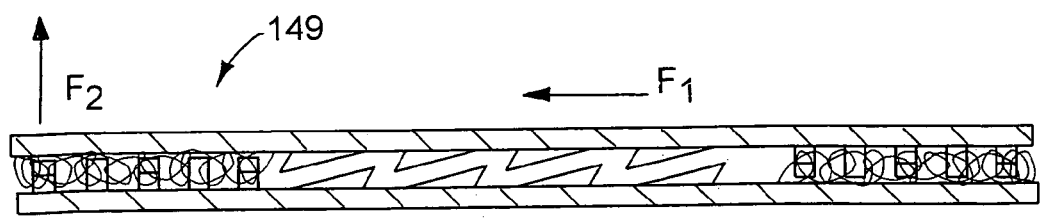
FIG. 18 is a side view of a fastener system according to an embodiment.

Referring next to FIGS. 17 and 18, fastener component 139 includes engageable elements 140 similar to those of FIG. 1, and hooks 142,144 extending outwardly from one side of a sheet-form base 146. In the embodiment shown in FIG. 17, hooks 142,144 extend toward and away from the viewer, respectively. In addition, loops 148 extend outwardly from the same side of the base 146 as the elements 140. Elements 140 are positioned between hooks 142,144 and loops 148. In some implementations, the elements 140,142 and 144 are molded at the same time using a modified version of the process described in FIG. 4. In this modified process, the mold roll includes a combination of the tooling described above and the tooling described in Fischer, U.S. Pat. No. 4,775,310. Tooling described in Fischer is formed by a face-to-face assembly of thin, circular plates, of thickness, for example, between about 0.004 inch and 0.250 inch (0.010 cm-0.635 cm). Some of the plates, referred to as mold rings, have cutouts in their circular peripheries that define mold cavities while others, referred to as spacer rings, have smooth circular peripheries. The sides of the spacer rings serve to close the open sides of the cutout mold cavities and to serve to create the row spacing between rows of molded features. In some implementations, the loops 148 are bonded to base 146 by using, for example, adhesive. In other embodiments, loops are fed to the nip and melt incorporated.

Referring now to FIG. 18, a fastener system 149 that has good shear and peel performance may be formed by engaging two fastener components 139. When a shear force $F_1$ is directed as shown in FIG. 18, fastener system 149 exhibits good shear performance due to engageable elements 140, as discussed above. In addition, when a peel force F2 is directed as shown in FIG. 18, fastener system 149 exhibits good peel performance due to the engagement of hooks 142,144 with loops 148.

Figure 19:
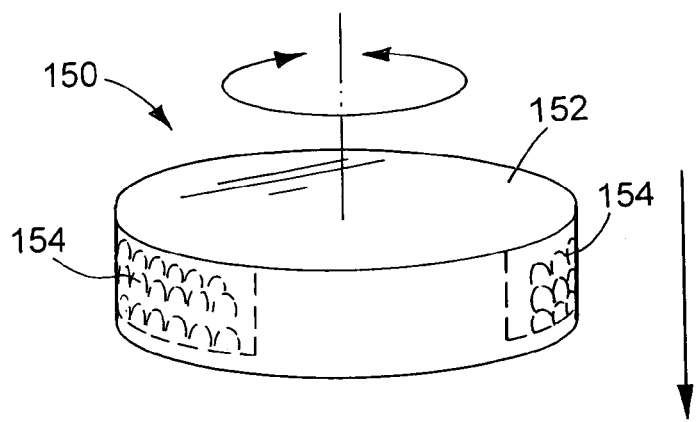
FIG. 19 is a perspective view of a fastening system according to an embodiment.
Figure 19:
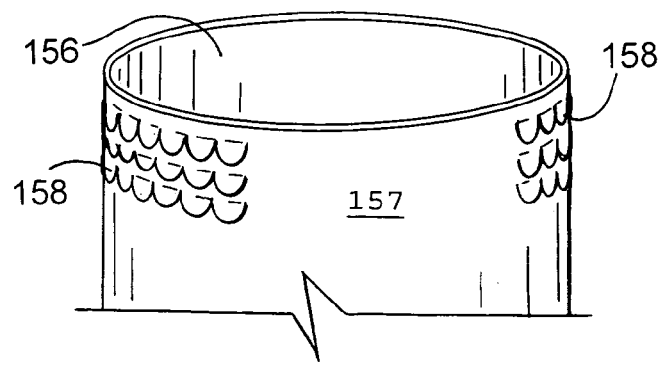

Referring to FIG. 19, a container 150 includes a top 152 sized to fit onto a bottom 156. Fixed upon an inside surface of top 152 are engageable elements 154. Also, fixed upon an outside surface of bottom 156 are engageable elements 158. The engageable elements 154,158 are similar to those shown in FIG. 1. Engageable elements 154 are fixed upon top 152 such that the elements 154 are oriented with the engageable sides pointing up as shown. Engageable elements 158 are fixed upon bottom 156 such that the elements 158 are oriented with the engageable sides pointing down as shown. To apply or remove top 152 from bottom 156, engageable elements 154 and vacant portions 157 are aligned, as are engageable elements 158 and vacant portions 155. Twisting top 152 clockwise or counter clockwise allows top 152 to become "locked" onto bottom 156 as the rows of engageable elements engage one another. Engageable elements 154,158 may be fixed using adhesive, or injection molded during the formation of the part.

Referring to FIG. 20, fastener component 170 includes engageable elements 172,174 that extend from portions of sheet-form base 176, the portions being disposed on opposite sides of base 176. Fastener component 174 can be made by the process of FIG. 4D or elements 172,174 can be bonded to base 176 using an adhesive. Referring to FIG. 20A, elements 172,174 are oriented such that upon wrapping base 176 in the manner shown in FIG. 21, a tubular structure 180 results that includes a dis-engageable, high shear fastener 181. Fastener component 170 is useful for, for example, holding insulation to pipes.

Referring to FIG. 21, two pipes 192,198, such as PVC pipes, can be joined by placing engageable elements 194,200 on pipes 192,198. Pipe 192 includes a resilient material 196 bonded to a wall that can act as a fluidic seal. Pipe 192 is sized to accept pipe 198 and engageable elements are oriented such that pushing pipe 198 into pipe 192 creates a high shear engagement, similar to that described when discussing FIG. 12. A fluid tight seal results upon further pushing pipe 198 into pipe 192 as pipe 198 engages and compresses resilient material 196. In some embodiments, the resilient material is, for example, a thermoset such as a natural rubber. In other implementations, resilient material 196 is, for example, a thermoplastic elastomer such as elastomeric PVC.

Figure 22:
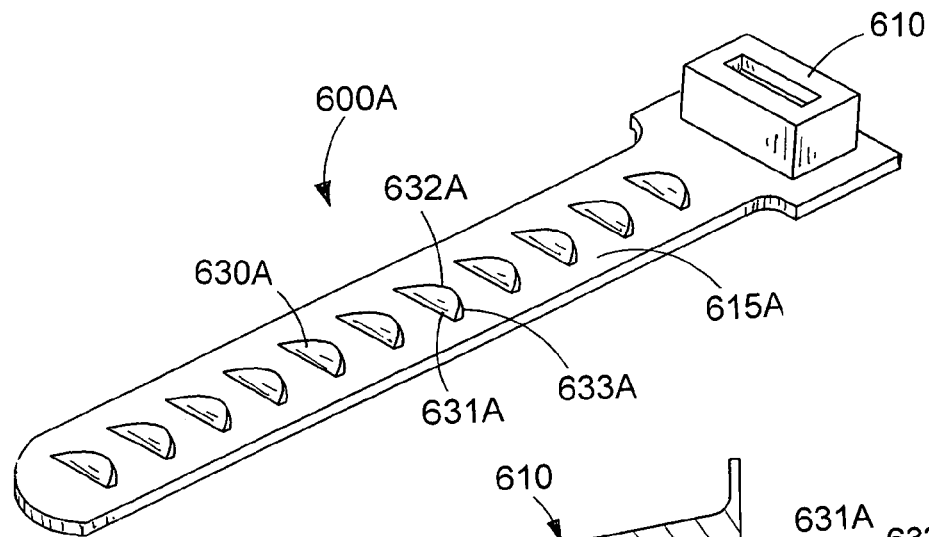
FIG. 22 is a fastener product.

Referring to FIG. 22, a fastener product 600A includes an array of arcuate engageable elements 630A integrally molded with, and extending outwardly from a base 615A. The engageable elements each include an engageable side 633A, and a non-engageable side 631A. Both the upper 632A and lower edges define curves (e.g., circular curves) such that the engageable side 633A has a curved shape, as descrbed above in reference to FIGS. 1, 1A-1B, 2A-2B. Similar fasteners are discussed in "FASTENER PRODUCTS," filed concurrently herewith, and assigned U.S. Ser. No. 60/574,212, the disclosure of which is hereby incorporated in full by reference herein.

Figure 23:
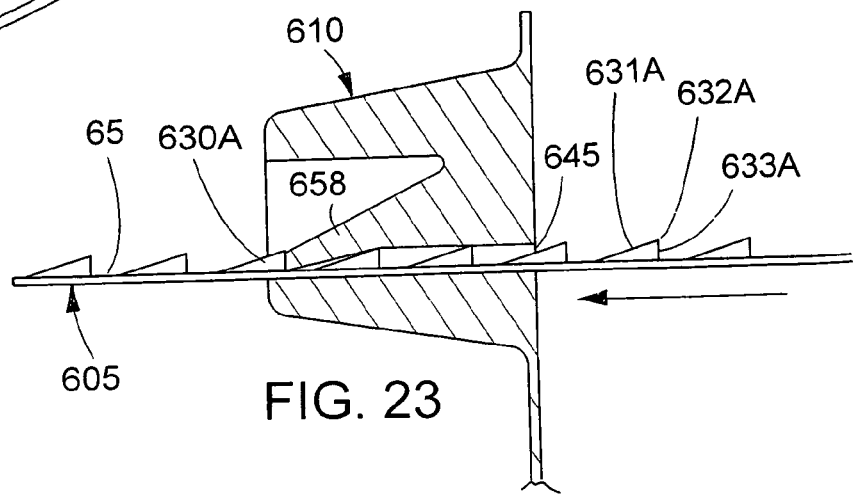
FIG. 23 is a partial cross-sectional view of a fastener product having a releasably retaining arm in a fastened position.

Referring to FIGS. 22 and 23, the head element 610 defines an aperture 645. When the fastener strap 605 is inserted through the aperture 645, the head element 610 cooperates with the fastener projections 630A to prevent the strap 605 from retreating back through the aperture 645. In other words, the head element 610 is configured such that it provides one-way movement through the aperture 645. The head element 610 includes a retaining arm 658 that extends into the aperture 645. When the strap 605 is pulled through the aperture 645 in the direction of the arrow, the first surfaces 631A (non-engageable side) of the wedge-shaped fastener projections 630A deflect the retaining arm 658 away from the projections 630A allowing the strap 605 to proceed through the head element 610. However, when the strap 605 is pulled in a direction opposite to that shown by the arrow, the second surface 633A (engageable side) of the projection 630A abuts and engages the retaining arm 658. This prevents the strap 605 from exiting the head element 610. The fastener product shown in FIG. 23 can be used to retain articles (e.g., tubes or pipes) in a bundle. Similarly, they can be used to suspend an article or articles from a beam or other structure. In addition, the fastener products can be useful as a human restraint mechanism (e.g., handcuffs). They can be wrapped around the wrists or ankles of a person and tightly fastened to restrain the person.

Figure 24:
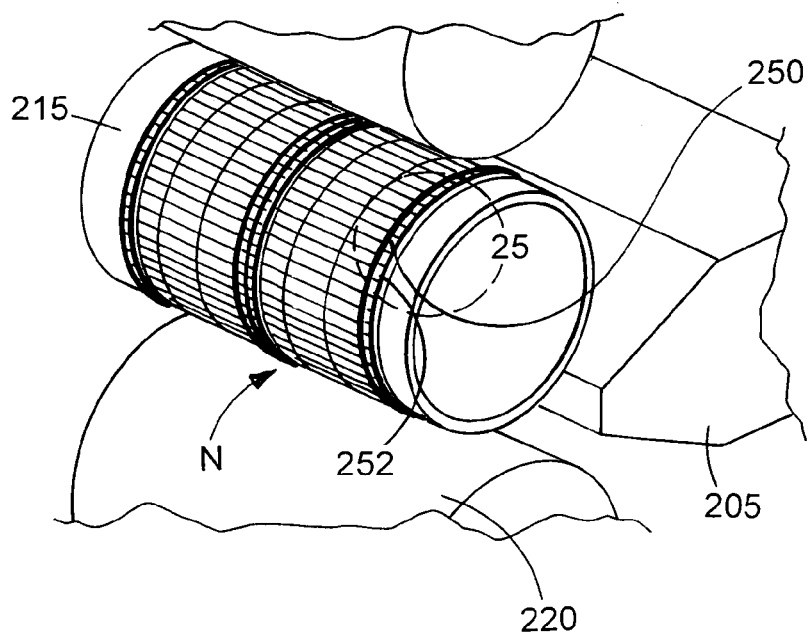
FIG. 24 is a perspective view of a molding nip for producing the fastener product of FIG. 26.

Referring to FIG. 24, an apparatus is shown that can be used to produce the fastener product shown in FIG. 22. Mold roll 215 includes multiple lanes of molding cavities 252 arranged across its transverse direction. Each lane of molding cavities is circumferentially separated along the mold roll 215 such that the fastener product sheet molded, when molten resin is delivered to nip N by die 205 connected to an extruder, includes multiple, longitudinally separated lanes of fastener projections. In other embodiments, the mold roll can include a continuous array of molding cavities spanning the circumferential surface of the mold roll. The mold roll 215 also includes multiple, circumferentially spaced molding recesses 250. As a result, the fastener product sheet molded in the process includes multiple, longitudinally spaced apart head elements and/or holes defined by the head elements.

Referring to FIG. 24, the mold roll 215 includes wedge-shaped molding cavities 252 to mold wedge-shaped fastener projections. The cavities 252 include a first planar surface that extends inward from the peripheral surface of the mold roll 215 at a decline relative to the peripheral surface. The cavities 252 include a second surface that extends inward at a decline substantially steeper than the decline of the first surface. The first and second surfaces join together at their distal ends within the cavities 252. In some embodiments, the second surface is curved to form a projection having a curved wall.

Figure 25:
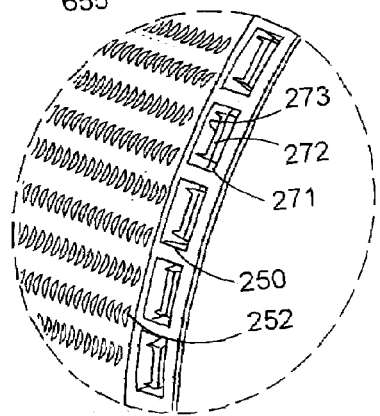
FIG. 25 shows area 25 of FIG. 24.

Referring to FIG. 25, the molding recesses 250 include an outer recessed portion 271 to form the head element and an inner unrecessed portion 272 to form the hole within the head element. The inner unrecessed portion 272 includes a recess 273 that extends inward at an angle relative to the side surfaces of the head element for forming the restraining arm that extends from the head element. In the embodiment discussed above, the molding cavities 252 and recesses 250 are each located in the mold roll 215. In alternative embodiments, the pressure roll 220 can define the molding recesses 250 and cavities 252. Similarly, the recesses 250 and cavities 252 can be located, in various combinations, in both the mold roll 215 and the pressure roll 220.

Figure 26:
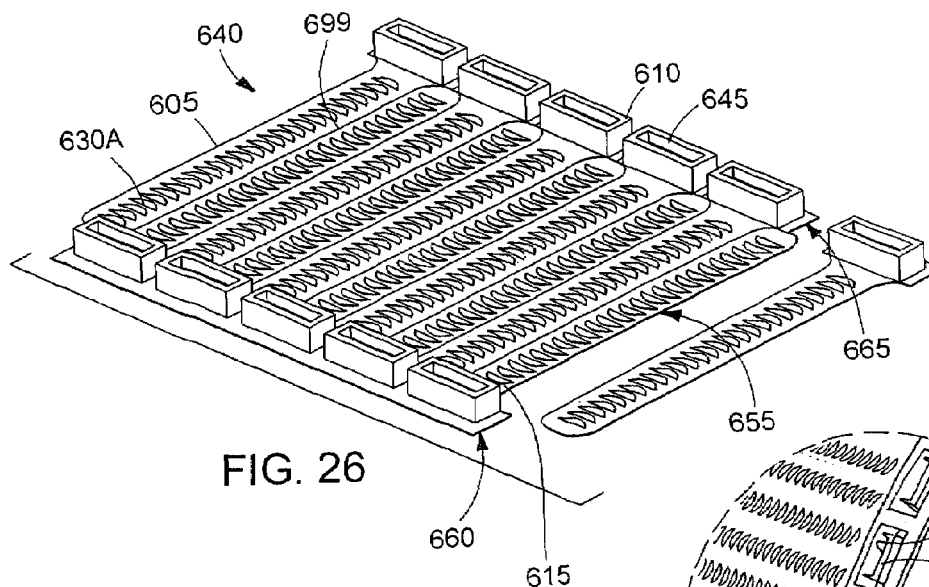
FIG. 26 is a perspective view of a fastener product sheet, and a product that has been separated from the sheet.
Figure 27:
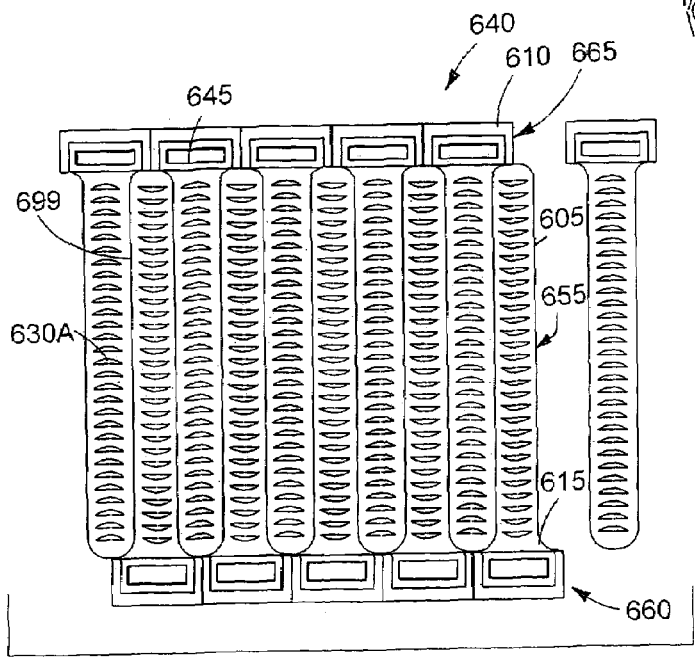
FIG. 27 is a plan view of the fastener product of FIG. 26.
Figure 28:
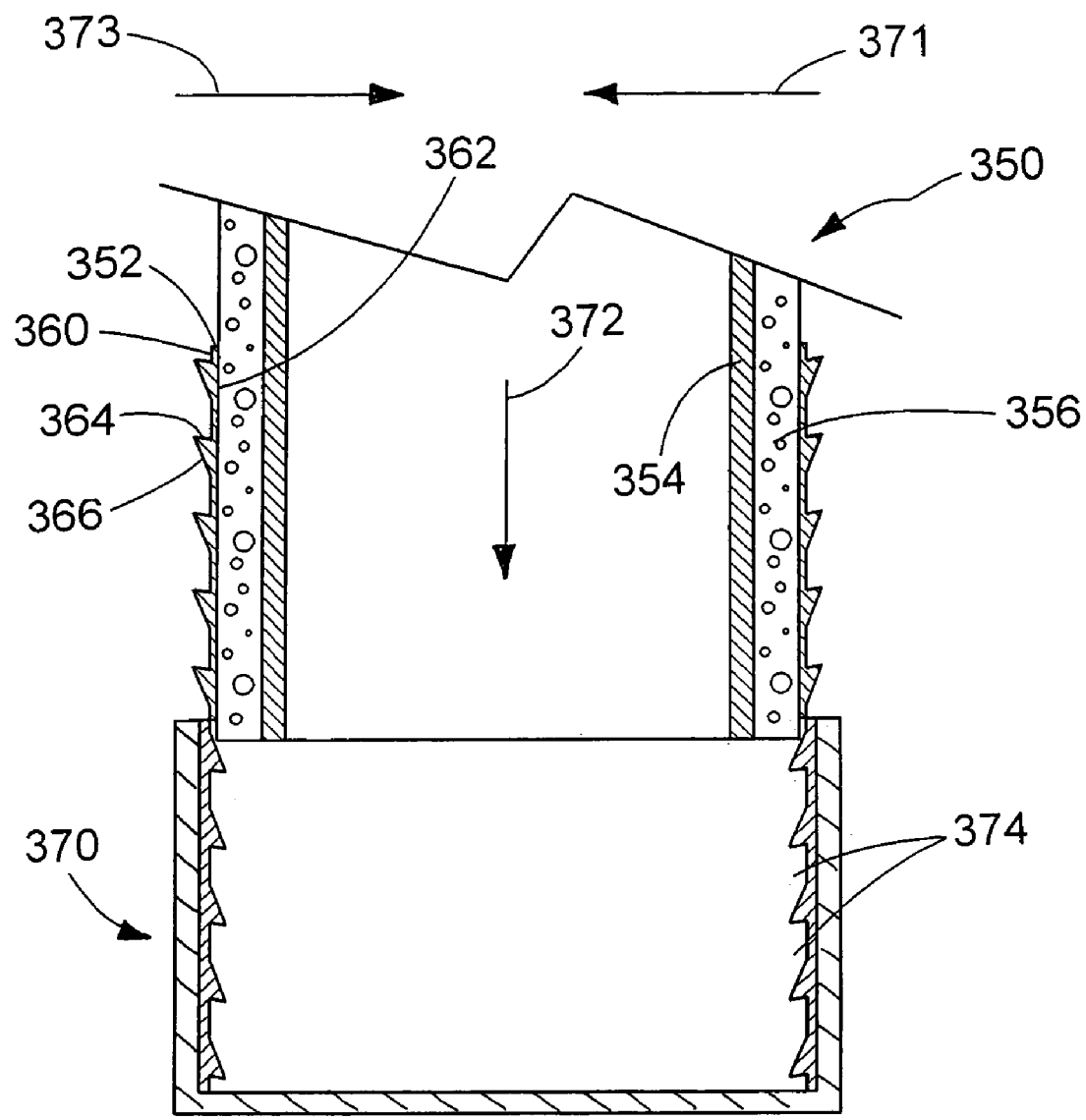
FIG. 28 is a cross-sectional view of a compliant material sandwiched between a tubular structure, and a base that includes engageable elements.

Referring to FIGS. 26 and 27, a fastener product sheet 640 formed using the apparatus shown in FIG. 17 includes a central region 655 and two end regions 660, 665. The central region 655 includes a base 615 from which multiple horizontal lanes of fastener projections 630A extend. The edge regions 660, 665 include longitudinally spaced head elements 610 that define longitudinally spaced holes or apertures 645. The fastener product sheet 640 can be separated along predetermined frangible boundaries 699 (e.g., perforated regions) to create multiple, discrete fastener products similar to the fastener product 600A shown in FIG. 22. Any of the separating methods discussed above can be used to create the discrete fastener products Referring to FIG. 28, a tubular fastener component 350 includes a resilient material 356, e.g., a foam, or an elastomer, sandwiched between a tubular structure 354, and a base 352 that includes array of wedge-shaped, engageable elements extending from a first side 352. The second side 362 of base 352 is bound to the compliant material 356, e.g., is integral with, or is bound with an adhesive. The array of wedge-shaped, engageable elements each have an engageable side 364, and a non-engageable side 366, like those shown in FIG. 1. Structurally rigid tubular fastener component 370 with has a wall from which wedge-shaped, engageable elements extend. The orientation of the engageable elements that extend from component 370 are generally opposite of those of component 350. The outer diameter of component 350 is oversized relative to the inner diameter of component 370. When component 350 is inserted into component 370 in direction 372, the resilient material allows for radial flex of the engageable elements in directions 371,373 as they slide past the engageable elements of component 370, springing back into regions 374. This spring-type action ensures good engageability of the engageable elements.

Other embodiments have also been considered. For example, while fastener components having identical elements have been shown in the figures and discussed above, in some cases the fastener components may include elements having different geometries. While hollow tubular components having fastener elements on their inner and outer surfaces have been shown and discussed above (FIG. 11), a solid, injection molded male part in some cases is advantageous. The hooks in the embodiment shown in FIG. 17 may be oriented differently. For example, the hooks may all be oriented in the same direction.

Other embodiments are within the scope of the following claims.

What is claimed is:

1. A seat bun, comprising:
   a compliant material with a surface having a central region bounded on two opposite sides by elongated trenches; and
   a fastener component disposed within each trench, the fastener component comprising a sheet-form base, and an array of wedge-shaped, engageable elements extending integrally from at least one side of the sheet-form base, the engageable elements each having an engageable side and a non-engageable side conterminous at an upper edge of the element, wherein the upper edge of each engageable element defines a curve in top view, wherein the engageable sides of a majority of the elements are oriented in a common direction, wherein the engageable side intersects an upper surface of the base and the non-engageable side extends from the base to the upper edge of the element, and wherein each fastener component is arranged with the non-engageable sides of its wedge-shaped elements directed out of the trench.

2. The seat bun of claim 1, wherein the fastener components comprise elongated, U-shaped structures extending along each trench.

3. The seat bun of claim 1, wherein the fastener components comprise tubular structures embedded within each trench.

4. The fastener component of claim 1, wherein the engageable elements are arranged in at least one row along the sheet-form base.

5. The fastener component of claim 4, wherein the elements are arranged in multiple rows, with elements of adjacent rows offset from one another along their respective rows.

6. The fastener component of claim 1, wherein the curve defined by the upper edge in top view is substantially circular with a constant radius of curvature.

7. The fastener component of claim 1, wherein the non-engageable side of each fastener element rises from the sheet-form base at an angle of between about 5 and 45 degrees.

8. The fastener component of claim 1, wherein the engageable sides of the wedge-shaped elements overhang the sheet-form base.

9. The fastener component of claim 8, wherein the engageable side of each fastener element extends downward from the upper edge toward the sheet-form base at an undercut angle, measured in a midplane bisecting the fastener element and perpendicular to the sheet-form base, of between about 10 and 45 degrees.

10. A self engageable fastener component, comprising:
a sheet-form base;
an array of wedge-shaped, engageable elements extending integrally from at least one side of the sheet-form base, the engageable elements each having an engageable side and a non-engageable side conterminous at an upper edge of the element, the engageable side intersecting an upper surface of the base and the non-engageable side extending from the base to the upper edge of the element; and
hook-shaped projections proximate the wedge-shaped engageable elements, wherein the upper edge of each engageable element defines a curve in top view, and wherein the engageable sides of a majority of the elements are oriented in a common direction.

11. The fastener component of claim 10, further comprising engageable loops proximate the wedge-shaped elements.

12. The fastener component of claim 10, wherein the non-engageable side of each fastener element rises from the sheet-form base at an angle of between about 5 and 45 degrees.

13. The fastener component of claim 10, wherein the engageable sides of the wedge-shaped elements overhang the sheet-form base.

14. The fastener component of claim 13, wherein the engageable side of each fastener element extends downward from the upper edge toward the sheet-form base at an undercut angle, measured in a midplane bisecting the fastener element and perpendicular to the sheet-form base, of between about 10 and 45 degrees.

15. A self engageable fastener component, comprising:
a sheet-form base; and
an array of wedge-shaped, engageable elements extending integrally from at least one side of the sheet-form base, the engageable elements each having an engageable side and a non-engageable side conterminous at an upper edge of the element, the engageable side intersecting an upper surface of the base and the non-engageable side extending from the base to the upper edge of the element; and
engageable loops proximate the wedge-shaped elements, wherein the upper edge of each engageable element defines a curve in top view, and wherein the engageable sides of a majority of the elements are oriented in a common direction.

16. The fastener component of claim 15, further comprising hook-shaped projections proximate the wedge-shaped engageable elements.

17. The fastener component of claim 15, wherein the non-engageable side of each fastener element rises from the sheet-form base at an angle of between about 5 and 45 degrees.

18. The fastener component of claim 15, wherein the engageable sides of the wedge-shaped elements overhang the sheet-form base.

19. The fastener component of claim 18, wherein the engageable side of each fastener element extends downward from the upper edge toward the sheet-form base at an undercut angle, measured in a midplane bisecting the fastener element and perpendicular to the sheet-form base, of between about 10 and 45 degrees.

20. A self-engageable fastener component, comprising:
a sheet-form base; and
an array of wedge-shaped, engageable elements extending integrally from at least one side of the sheet-form base and arranged in multiple rows, the engageable elements each having an engageable side and a non-engageable side conterminous at an upper edge of the element;
wherein the upper edge of each engageable element defines a curve in top view;
wherein the engageable sides of a majority of the elements are oriented in a common direction and overhang the sheet-form base to resist separation of a mating fastener element;
wherein the engageable side intersects an upper surface of the base and the non-engageable side extends from the base to the upper edge of the element; and
wherein pairs of adjacent fastener elements in each row define corresponding wells therebetween for receiving an upper edge of a mating fastener element.

21. The fastener component of claim 20, wherein the engageable elements are arranged in an array of multiple rows and columns.

22. The fastener component of claim 20, wherein the engageable elements are arranged in multiple rows, with engageable elements of adjacent rows offset from one another along their respective rows.

23. The fastener component of claim 22, wherein the engageable elements of adjacent rows are offset by about one-half a nominal spacing between adjacent engageable elements within a row.

24. The fastener component of claim 20, wherein the curve defined by the upper edge in top view is substantially circular with a constant radius of curvature.

25. The fastener component of claim 24, wherein the constant radius of curvature is from about 0.25 to 2.5 centimeters.

26. The fastener component of claim 20, wherein the curve defined by the upper edge in top view is of a group consisting of parabolic curves, ellipsoidal curves, hyperbolic curves, and mixtures thereof.

27. The fastener component of claim 20, wherein a maximum elevation of the upper edge above the top surface of the sheet-form base is between about 0.025 and 6.3 millimeters.

28. The fastener component of claim 20, wherein each engageable element has a width, measured along the sheet-form base perpendicular to said single edge, of between about 0.13 and 6.3 millimeters.

29. In combination, two fastener components each according to claim 28, arranged with the engageable sides of their wedge-shaped elements overlapping one another to resist shear motion between the fastener components.

30. The fastener component of claim 20, wherein each engageable element has a length, measured along the sheet-form base parallel to said edge, of between about 0.13 and 2.54 centimeters.

31. The fastener component of claim 20, wherein the non-engageable side of each fastener element rises from the sheet-form base at an angle of between about 5 and 45 degrees.

32. The fastener component of claim 20, wherein the engageable side of each fastener element extends downward from the upper edge toward the sheet-form base at an undercut angle, measured in a midplane bisecting the fastener element and perpendicular to the sheet-form base, of between about 10 and 45 degrees.

33. The fastener component of claim 20, wherein the engageable elements extend outwardly from two opposite sides of the sheet-form base.

34. The fastener component of claim 20, wherein the sheet-form base forms a tube, with the wedge-shaped elements extending from a curved surface of the tube.

35. The fastener component of claim 34, wherein the curved surface comprises an outer surface of the tube.

36. The fastener component of claim 34, wherein the curved surface comprises an inner surface of the tube.

37. The fastener component of claim 34, wherein the tube defines a longitudinal gap extending along its length between opposite edges of the sheet-form base.

38. The fastener component of claim 20, wherein the sheet-form base forms an elongated, U-shaped structure.

39. The fastener component of claim 38, wherein the wedge-shaped elements extend from an inside surface of the U-shaped structure, a majority of the engageable sides of the wedge-shaped elements directed away from an open edge of the U-shaped structure.

40. The fastener component of claim 38, wherein the wedge-shaped elements extend from an outside surface of the U-shaped structure.

41. The fastener component of claim 20, wherein the sheet-form base forms an elongated strap.

42. The fastener component of claim 41, comprising only a single row of said wedge-shaped elements, all arranged with their engageable sides directed toward an end of the strap.

43. The fastener component of claim 41, defining an aperture adjacent one end of the strap, the aperture sized to receive an opposite end of the strap therethrough.

44. The fastener component of claim 43, further comprising an exposed retention edge along one side of the aperture, the retention edge positioned to engage the engageable sides of the wedge-shaped elements with the opposite end of the strap pulled through the aperture, to resist removal of the strap from the aperture.

45. The fastener component of claim 20, wherein the sheet-form base is secured to, and overlays a layer of resilient material.

46. The fastener component of claim 45, wherein the sheet-form base is flexible.

* * * * *

UNITED STATES PATENT AND TRADEMARK OFFICE
CERTIFICATE OF CORRECTION

PATENT NO. : 7,478,460 B2
APPLICATION NO. : 10/785133
DATED : January 20, 2009
INVENTOR(S) : Gallant et al.

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by 366 days.

Delete the phrase "by 366 days" and insert -- by 522 days --

Signed and Sealed this

Fourth Day of May, 2010

David J. Kappos
*Director of the United States Patent and Trademark Office*